US008086687B2

(12) United States Patent
Matoba

(10) Patent No.: US 8,086,687 B2
(45) Date of Patent: Dec. 27, 2011

(54) WORKFLOW EXECUTING APPARATUS AND CONTROL METHOD OF THE APPARATUS AND PROGRAM THEREOF

(75) Inventor: Tatsuo Matoba, Yokohama (JP)

(73) Assignee: Canon Kabushiki Kaisha (JP)

(*) Notice: Subject to any disclaimer, the term of this patent is extended or adjusted under 35 U.S.C. 154(b) by 685 days.

(21) Appl. No.: 12/098,232

(22) Filed: Apr. 4, 2008

(65) Prior Publication Data

US 2008/0250479 A1 Oct. 9, 2008

(30) Foreign Application Priority Data

Apr. 5, 2007 (JP) ................................ 2007-099748

(51) Int. Cl.
*G06F 15/16* (2006.01)
*G06Q 10/00* (2006.01)

(52) U.S. Cl. ........................ 709/207; 709/206; 705/7.27

(58) Field of Classification Search .......... 709/206–207; 705/7.27
See application file for complete search history.

(56) References Cited

U.S. PATENT DOCUMENTS 7,080,099 B2 * 7/2006 Tada et al. ..................... 707/771
7,200,636 B2 * 4/2007 Harding ........................ 709/206
7,487,183 B1 * 2/2009 Schmidt ................................ 1/1
7,720,865 B2 * 5/2010 Hashimoto ................... 707/785
7,756,935 B2 * 7/2010 Gaucas ........................ 709/206
2002/0165882 A1 * 11/2002 Zettel et al. ................... 707/530
2003/0041112 A1 * 2/2003 Tada et al. ..................... 709/206
2003/0103232 A1 * 6/2003 Twede ......................... 358/1.15
2004/0114194 A1 6/2004 Eguchi et al.
2004/0194010 A1 9/2004 Kirihara et al.
2006/0010097 A1 * 1/2006 Hashimoto ....................... 707/1
2006/0184883 A1 * 8/2006 Jerrard-Dunne et al. ..... 715/742
2008/0007770 A1 * 1/2008 Tokunaga .................... 358/1.15
2008/0063423 A1 * 3/2008 Matoba ........................... 399/76

FOREIGN PATENT DOCUMENTS

CN 1507261 A 6/2004
JP 2001014231 A 1/2001
JP 2001084193 A 3/2001
JP 2006-338631 A 12/2006

OTHER PUBLICATIONS

Notification of First Office Action issued in corresponding Chinese Patent Application No. 2008100899089 dated Oct. 9, 2009.

* cited by examiner

*Primary Examiner* — Christian LaForgia
(74) *Attorney, Agent, or Firm* — Rossi, Kimms & McDowell LLP

(57) ABSTRACT

A workflow executing apparatus that executes processing in accordance with a workflow, the apparatus comprising: a workflow information storage section that stores workflow information describing the workflow; a transmission control section that transmits an e-mail during the process of the workflow to a user that requested that workflow, in accordance with the stored workflow information; and a workflow execution section that adds identification information of e-mails transmitted prior to the e-mail transmitted by the transmission control section to the stated e-mail and sends the e-mail.

11 Claims, 13 Drawing Sheets

FIG. 5

```
...
<workflow wfid="wfid_001"  caption="BOOKBINDING PRINTING REQUEST" totalstep="5" ...>
        ...
</workflow>
<workflow wfid="wfid_004"  caption="MASS PRINT PERMISSION REQUEST" totalstep="3" ...>
        <activity actid="aid_req_001" role="everyone" caption='APPLY" step="1" ...>
                <action type="scantobox" boxno="03"/>
                <action type="email" to"requestor" mailtype="certify_004"/>
                <action type="email" to"superior" mailtype="req_004"/>
        </activity>
        <activity actid="aid_recog_001" role="superior" caption="ACCEPT" step="2" ...>
                <judge type="ok" nextstep="3">
                        <action type="email" to"requestor" mailtype="permit_004"/>
                </judge>
                <judge type="ng" nextstep="999">
                        <action type="email" to"requestor superior" mailtype="reject_004" last="true"/>
                </judge>
        </activity>
        <activity actid="aid_print_004" role="requestor" caption="PRINT" step="3" ...>
                <action type="boxprint" boxno="03"/>
                <action type="email" to="requestor superior" mailtype="finish_004" last="true"/>
        </activity>
        <comment>APPLYING FOR PERMISSION TO PRINT 100 OR MORE COPIES</comment>
</workflow>
<workflow wfid="wfid_005"  caption="POSTER CREATION REQUEST" totalstep="3" ...>
        ...
</workflow>
...
```

| FLOW JOB ID (601) | START TIME (602) | STARTING USER ID (603) | FLOW ID (604) | CURRENT STEP (605) | END STATUS (606) | Message-Id (607) | References (608) | JOB DATA (609) | ... |
|---|---|---|---|---|---|---|---|---|---|
| ... | ... | ... | ... | ... | ... | ... | ... | ... | ... |
| f_348 | 06/05/23 10:00 | suzuki | wfid_001 | 4/5 | ... | wf001-348.001@mfp1.mail.jp | wf001-348.001@mfp1.mail.jp, wf001-348.002@mfp1.mail.jp | a4/bw/book | ... |
| f_349 | 06/05/25 09:00 | sato | wfid_003 | 3/3 | ok | wf003-349.001@mfp1.mail.jp | wf003-349.001@mfp1.mail.jp | cdr/1 | ... |
| f_350 | 06/05/26 10:30 | kimura | wfid_004 | 2/3 | ... | wf004-350.001@mfp1.mail.jp | wf004-350.001@mfp1.mail.jp, wf004-350.002@mfp1.mail.jp | a4/cl/100 | ... |
| f_351 | 06/05/26 17:30 | ito | wfid_005 | 2/3 | ... | wf005-351.001@mfp1.mail.jp | ... | a0/cl/10 | ... |
| f_352 | 06/05/27 08:30 | kato | wfid_003 | 1/3 | cancel | ... | ... | a4/cl/1000 | ... |
| ... | ... | ... | ... | ... | ... | ... | ... | ... | ... |

FIG. 7

| | SUBJECT | SENDER | DATE/TIME | | ... |
|---|---|---|---|---|---|
| ✉ | [WFID_004]MASS PRINT PERMISSION:PRINTING ENDED 034 | MFP001 | 2006/10/31 | 10:34 | |
| ✉ | [WFID_004]MASS PRINT PERMISSION:PRINTING ENDED 023 | MFP001 | 2006/10/31 | 7:14 | |
| ✉ | [WFID_004]MASS PRINT PERMISSION:PRINTING ENDED 010 | MFP001 | 2006/10/30 | 23:13 | |
| ✉ | [WFID_004]MASS PRINT PERMISSION:ACCEPTED 034 | MFP001 | 2006/10/30 | 12:15 | |
| ✉ | [WFID_004]MASS PRINT PERMISSION:ACCEPTED 023 | MFP001 | 2006/10/29 | 21:15 | |
| ✉ | [WFID_004]MASS PRINT PERMISSION:APPLICATION 034 | MFP001 | 2006/10/29 | 19:41 | |
| ✉ | [WFID_004]MASS PRINT PERMISSION:PRINTING ENDED 015 | MFP001 | 2006/10/29 | 19:29 | |
| ✉ | [WFID_004]MASS PRINT PERMISSION:ACCEPTED 015 | MFP001 | 2006/10/29 | 12:01 | |
| ✉ | [WFID_004]MASS PRINT PERMISSION:APPLICATION 023 | MFP001 | 2006/10/29 | 9:15 | |
| ✉ | [WFID_004MASS PRINT PERMISSION:ACCEPTED 010 | MFP001 | 2006/10/28 | 18:30 | |
| ✉ | [WFID_004]MASS PRINT PERMISSION:APPLICATION 015 | MFP001 | 2006/10/27 | 22:34 | |
| ✉ | [WFID_004]MASS PRINT PERMISSION:APPLICATION 010 | MFP001 | 2006/10/27 | 21:24 | |
| ✉ | [WFID_004]MASS PRINT PERMISSION:PRINTING ENDED 004 | MFP001 | 2006/10/04 | 16:50 | |
| ✉ | [WFID_004]MASS PRINT PERMISSION:ACCEPTED 004 | MFP001 | 2006/10/03 | 11:45 | |
| ✉ | [WFID_004]MASS PRINT PERMISSION:APPLICATION 004 | MFP001 | 2006/09/29 | 11:00 | |

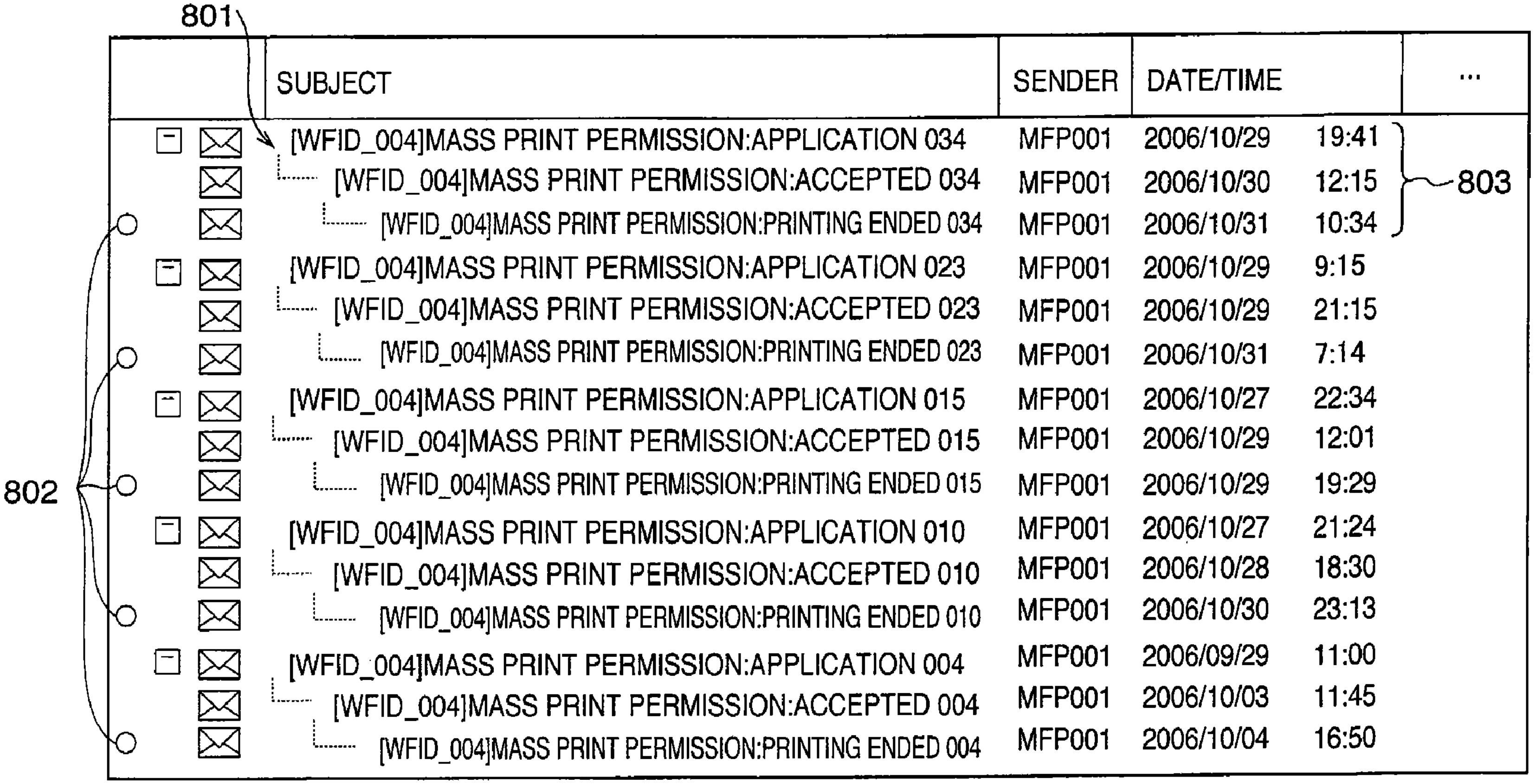

FIG. 8

| | SUBJECT | SENDER | DATE/TIME | ... |
|---|---|---|---|---|
| ☒ | [WFID_004]MASS PRINT PERMISSION:APPLICATION 034 | MFP001 | 2006/10/29 | 19:41 |
| ☒ | [WFID_004]MASS PRINT PERMISSION:ACCEPTED 034 | MFP001 | 2006/10/30 | 12:15 |
| ☒ | [WFID_004]MASS PRINT PERMISSION:PRINTING ENDED 034 | MFP001 | 2006/10/31 | 10:34 |
| ☒ | [WFID_004]MASS PRINT PERMISSION:APPLICATION 023 | MFP001 | 2006/10/29 | 9:15 |
| ☒ | [WFID_004]MASS PRINT PERMISSION:ACCEPTED 023 | MFP001 | 2006/10/29 | 21:15 |
| ☒ | [WFID_004]MASS PRINT PERMISSION:PRINTING ENDED 023 | MFP001 | 2006/10/31 | 7:14 |
| ☒ | [WFID_004]MASS PRINT PERMISSION:APPLICATION 015 | MFP001 | 2006/10/27 | 22:34 |
| ☒ | [WFID_004]MASS PRINT PERMISSION:ACCEPTED 015 | MFP001 | 2006/10/29 | 12:01 |
| ☒ | [WFID_004]MASS PRINT PERMISSION:PRINTING ENDED 015 | MFP001 | 2006/10/29 | 19:29 |
| ☒ | [WFID_004]MASS PRINT PERMISSION:APPLICATION 010 | MFP001 | 2006/10/27 | 21:24 |
| ☒ | [WFID_004]MASS PRINT PERMISSION:ACCEPTED 010 | MFP001 | 2006/10/28 | 18:30 |
| ☒ | [WFID_004]MASS PRINT PERMISSION:PRINTING ENDED 010 | MFP001 | 2006/10/30 | 23:13 |
| ☒ | [WFID_004]MASS PRINT PERMISSION:APPLICATION 004 | MFP001 | 2006/09/29 | 11:00 |
| ☒ | [WFID_004]MASS PRINT PERMISSION:ACCEPTED 004 | MFP001 | 2006/10/03 | 11:45 |
| ☒ | [WFID_004]MASS PRINT PERMISSION:PRINTING ENDED 004 | MFP001 | 2006/10/04 | 16:50 |

```
...
Date: Tue, 31 Oct 2006 10:31:30 +0900
From: MFP001 <mfp001@mfp1.mail.jp>
To: User A <user_a@mfp1.mail.jp>
Subject: [WFID_004] MASS PRINT PERMISSION: PRINTING ENDED 034
In-Reply-To: <wf004-350.002@mfp1.mail.jp>
References: <wf004-350.001@mfp1.mail.jp> <wf004-350.002@mfp1.mail.jp>
Message-Id: <wf004-350.003@mfp1.mail.jp>
X-Priority-4
...
```

901
902
903

WORKFLOW EXECUTING APPARATUS AND CONTROL METHOD OF THE APPARATUS AND PROGRAM THEREOF

BACKGROUND OF THE INVENTION

1. Field of the Invention

The present invention relates to a workflow executing apparatus that executes a serial workflow configured by combining a plurality of steps, a control method of the apparatus, as well as a program thereof.

2. Description of the Related Art

There exists a conventional workflow executing apparatus that configures a serial workflow by combining a plurality of processing steps and executes that workflow in an office. Furthermore, in this configuration, an e-mail containing a notification/processing request/confirmation/etc. regarding the workflow is automatically sent from the workflow executing apparatus to a user (a PC). With this setup, the workflow processing can be easily advanced by using the e-mail, without a dedicated workflow system needing to be installed in the user PC. Travel expense calculations, order requests, vacation applications, and the like can be given as examples of such a workflow.

With this setup, the user receives an e-mail from the workflow executing apparatus using an e-mail application installed in the user PC, and performs the workflow operations in accordance with the details written in the main body of the e-mail. With this type of e-mail used for workflows, identifiers such as the name of the workflow, identifiers for specifying the workflow, and the like are written into the main body, the subject, and so on of the e-mail.

The technique described hereinafter has been proposed as a technique regarding workflows and e-mails. According to this technique, an e-mail sent via an e-mail server is first received by a document server, and if that e-mail is a task-related e-mail, the e-mail data is assigned a task-related serial number and is registered in a database. The serial number is also added to the e-mail title as character string data. Furthermore, when transmitting/receiving e-mails thereafter, a Message-Id included in each e-mail is monitored in the document server, and associated e-mails regarding a task are recorded as a history of the task (see Japanese Patent Laid-Open No. 2001-084193).

However, the abovementioned conventional technique has the following problems, which arise when a user processes a plurality of workflows in parallel, when a large amount of time is required for a single workflow to complete, and so on.

The e-mail application on the user PC receives a plurality of e-mails transmitted from the workflow executing apparatus. At this time, it is possible that the user will experience difficulty in determining which workflow the e-mails are related to, and what time/date the related workflows are from (or continued from), based on the display provided by the e-mail application. In other words, in order to distinguish which workflow is associated with the received e-mail, it is necessary for the user to use a search function provided by the e-mail application of the PC to search for e-mails related to the same workflow, using an identifier for identifying the workflow written within the main body or the like of the e-mail as keys. For this reason, the usability of this setup for users is poor.

Meanwhile, an e-mail application normally includes functionality for sorting a list of e-mails based on the subject of the e-mails, and thus can rearrange e-mails by subject. However, when a large amount of e-mails regarding the same type of workflow are received, it is difficult to visually distinguish which e-mails are unprocessed, which e-mails have already been processed, and so on. For example, even if e-mails received due to the same workflow being repeatedly executed are sorted by subject, the results are similar to those shown in FIG. 7. In FIG. 7, a list of received e-mails is displayed, the e-mails having been arranged in order by date. For this reason, even if, for example, the user has received an e-mail indicating that a workflow has ended, the user cannot easily distinguish which workflow has ended.

The technique of Japanese Patent Laid-Open No. 2001-084193, proposed as a technique regarding workflows and e-mails, causes all data from an e-mail server to first pass through a document server, whereupon whether each e-mail is task-related or not is monitored and registered. With this technique, a user transmits a new e-mail, and e-mails transmitted/received by other users in response to that new e-mail are managed as a group. However, while the document server of Japanese Patent Laid-Open No. 2001-084193 can, in terms of memory, manage the e-mails as a group, it cannot necessarily display these e-mails as a group. This is because the subject or the like used during sorting is not necessarily a term that indicates that the e-mails in question are a group. Accordingly, although this document server technique can be applied to a user PC that receives e-mails from workflows, the technique cannot improve the usability in the user PC.

SUMMARY OF THE INVENTION

An aspect of the present invention is to eliminate the abovementioned conventional problems.

Another aspect of the present invention is to make it possible for a user that has instructed a workflow to be executed to easily confirm the execution process of the workflow based on a list of e-mails received during the process of the workflow.

According to an aspect of the present invention, there is provided a workflow executing apparatus for executing processing in accordance with a workflow that includes a plurality of processing steps, the apparatus comprising:

an e-mail transmission unit configured to transmit an e-mail to a device used by a user that requested the workflow to be executed during the process of the workflow, the workflow being executed in accordance with workflow information in which the content of the processing of the plurality of processing steps is described; and a transmission control unit configured to add, to the e-mail to be transmitted by the e-mail transmission unit, identification information of e-mails transmitted prior to the e-mail to be transmitted by the e-mail transmission unit, and transmit the e-mail;

wherein the transmission control unit sets identification information set in the Message-Ids of the e-mails transmitted previously in the References field of following e-mails, so that the plural e-mails transmitted during the process of the workflow are displayed in a continuous manner in the device used by the user.

According to an aspect of the present invention, there is provided a control method of a workflow executing apparatus that executes a process in accordance with a workflow that includes a plurality of processing steps, the method comprising the steps of:

transmitting an e-mail to a device used by a user that requested the workflow to be executed during the process of the workflow, the workflow being executed in accordance with workflow information in which the content of the processing of the plurality of processing steps is described; and controlling transmission by adding, to the e-mail to be transmitted in the transmitting step, identification information of e-mails transmitted prior to the e-mail to be transmitted in the transmitting step, and transmitting the e-mail, wherein in the controlling step, identification information set in the Message-Ids of the e-mails transmitted previously is set in the References field of following e-mails, so that the plural e-mails transmitted during the process of the workflow are displayed in a continuous manner in the device used by the user.

Further features and aspects of the present invention will become apparent from the following description of exemplary embodiments with reference to the attached drawings.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 5 is a diagram illustrating an example of a workflow data table, written in XML format, that shows an example of data stored in a workflow data storage section according to the embodiment of the present invention.

FIG. 6 is a diagram illustrating an example of a workflow status table stored in a workflow status storage section according to the embodiment of the present invention.

FIG. 7 is a diagram illustrating an example of a conventional e-mail list, in which a series of e-mails sent from a conventional workflow executing apparatus are filtered by "subject" and displayed as a received e-mail list so as to be easily distinguishable in an e-mail application installed in a user PC 101.

FIG. 8 is a diagram illustrating an example of a display of an e-mail list, in which e-mails from a serial workflow transmitted from the workflow executing apparatus according to the embodiment of the present invention are displayed using a thread display function of an e-mail application installed in a user PC.

DESCRIPTION OF THE EMBODIMENTS

Figure 1:
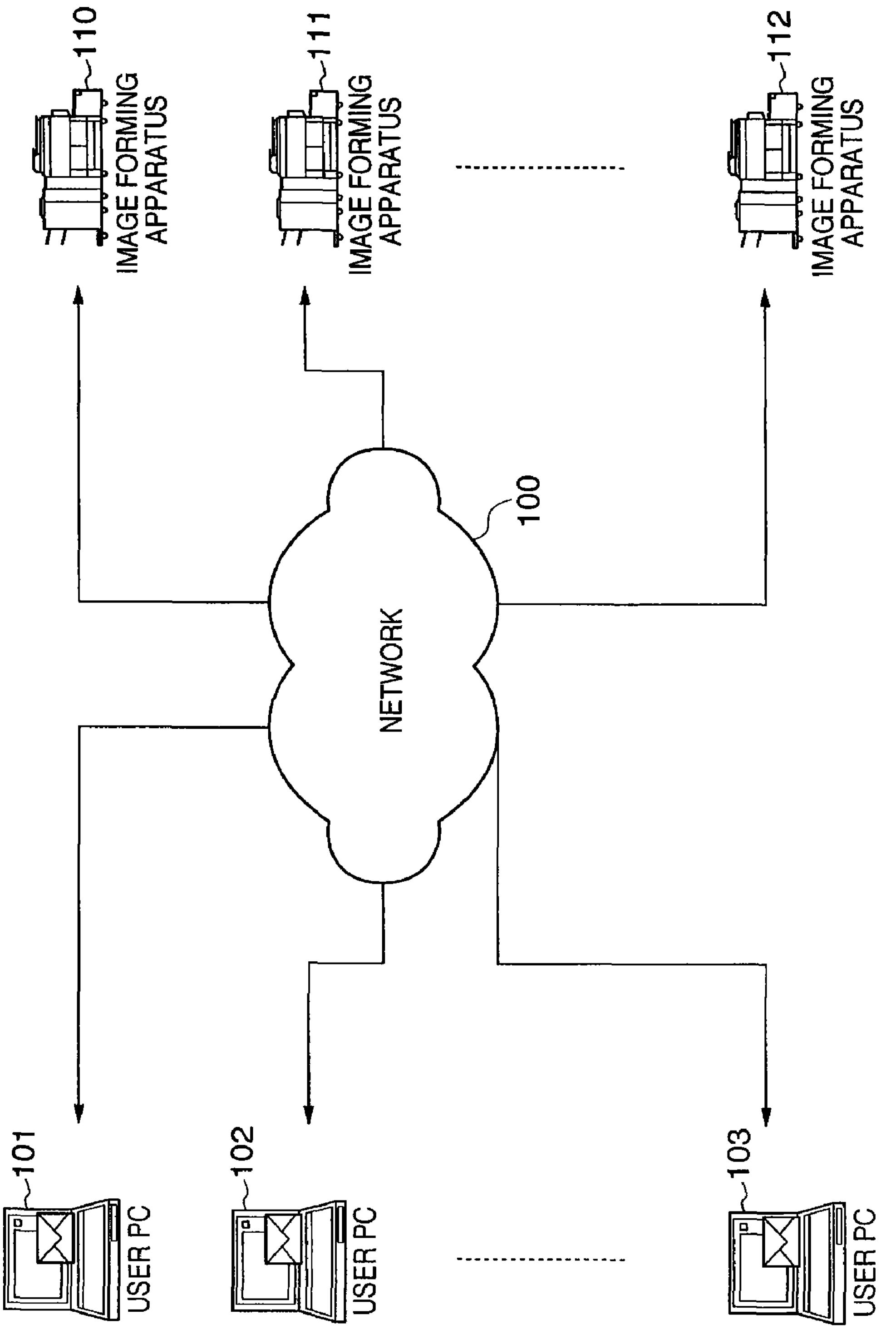
FIG. 1 is a diagram illustrating the overall configuration of a workflow system that includes a workflow executing apparatus according to an exemplary embodiment of the present invention.

Numerous embodiments of the present invention will now herein be described below in detail with reference to the accompanying drawings. The following embodiments are not intended to limit the claims of the present invention.

Note that in the present exemplary embodiment, descriptions are provided assuming that a workflow executing apparatus is applied in an image forming apparatus. However, the image forming apparatus is not a necessary element from the perspective of the workflow executing apparatus, and a general information processing apparatus (a computer) may be used instead.

Hereinafter, a simple outline of the present exemplary embodiment shall be described.

Settings such as the following are made in an e-mail transmitted to a user PC from a workflow executing apparatus that executes a workflow including a plurality of processing steps.

The workflow executing apparatus sets an e-mail header region identifier (in other words, a Message-Id) of the first e-mail transmitted in the workflow in the e-mail header (References) of e-mails required to be transmitted in order to continue the same workflow. In other words, the setting rule for e-mail headers normally set in a message responding to a received message is applied to e-mails transmitted from the workflow executing apparatus.

Meanwhile, a user PC, which has received those e-mails using the PC's e-mail application, displays the received e-mails as a list, through an e-mail list thread display of the e-mail application. Accordingly, e-mails received from the same workflow are displayed by the e-mail application as a sequence of threads. In other words, the e-mails are displayed so that the user can recognize which workflow the received e-mails are related to at a glance, without having to search for names, identifiers, and the like. Also, displaying the e-mail list of the e-mail application as a thread makes it possible for the user to visually recognize what stage the workflow-process has progressed to at a glance, which improves the usability for the user.

Furthermore, out of the e-mails transmitted from the workflow executing apparatus that executes a serial workflow, the e-mail transmitted to indicate that the final processing step of the workflow is to be processed is assigned an e-mail header indicating priority, in which a specific priority value is set. For example, "4", which indicates a "low" priority, is set in an X-Priority extended e-mail header in the e-mail that notifies the user that the workflow has ended. Accordingly, through an e-mail priority display function provided by the e-mail application in the PC, a priority icon, which indicates a specific priority, is added to the final e-mail sent from the workflow, and displayed. This makes it possible for the user to easily distinguish between whether a serial workflow is complete/incomplete based on the presence/absence of the priority icon. As a result, the usability can be further improved for the user.

Further still, in the case where the workflow executing apparatus has been applied in an image forming apparatus, workflow information is added to the print data, and the resultant is printed, at the printing stage of the workflow process executed by the image forming apparatus. More specifically, an identifier of the e-mail header (in other words, a Message-Id), destination e-mail address information, or the like of the first e-mail transmitted in the workflow is added to the print data as an electronic watermark, a barcode, cover sheet data, or the like, and the resultant is printed Paper printed in this manner (recording sheets) are read by the image forming apparatus in which the workflow executing apparatus has been applied, and the workflow information including the Message-Id identifier, e-mail address, or the like printed on this paper is confirmed. The image forming apparatus in which the workflow executing apparatus has been applied can therefore set the Message-Id identifier in the e-mail header (References) and transmit an e-mail to that e-mail address.

Meanwhile, the user that has received this e-mail using the PC's e-mail application displays the received e-mails as a list, in accordance with the e-mail list thread display of the e-mail application. Accordingly, e-mails transmitted from a workflow to which that e-mail is associated are displayed in the same thread. This makes it possible to recognize, at a glance, which workflow the workflow related to the received e-mail is associated with, using existing e-mail technology. This shall be described in detail hereinafter.

FIG. 1 is a diagram illustrating the overall configuration of a workflow system that includes the workflow executing apparatus according to an exemplary embodiment of the present invention.

As illustrated in FIG. 1, user PCs 101 to 103 are connected to image forming apparatuses 110 to 112, which function as workflow executing apparatuses, via a network 100. Note that the number of user PCs and image forming apparatuses is not intended to be limited to that shown in FIG. 1. Furthermore, the user PCs 101 to 103 have the same configurations as one another, and the image forming apparatuses 110 to 112 also have the same configurations as one another. Accordingly, the user PC 101 and the image forming apparatus 110 are used as representative examples in the following descriptions.

The user PC 101 is a general information processing apparatus (PC), which has a network interface for connecting to the network 100 and exchanging various types of data with the network 100, and is also equipped with a CPU, a ROM, a RAM, an HDD, and the like. This user PC 101 also includes a general e-mail application for transmitting/receiving e-mails, an Internet browsing program, and the like.

The image forming apparatus 110 also has a network interface for connecting to the network 100 and exchanging various types of data with the network 100. The image forming apparatus 110 is an image forming apparatus exemplified by an MFP (Multifunction Peripheral) that functions as a workflow executing apparatus. Although a LAN (Local Area Network) is given as an example of the network 100 in the present embodiment, another network system, such as the Internet, may be used as well.

Figure 2:
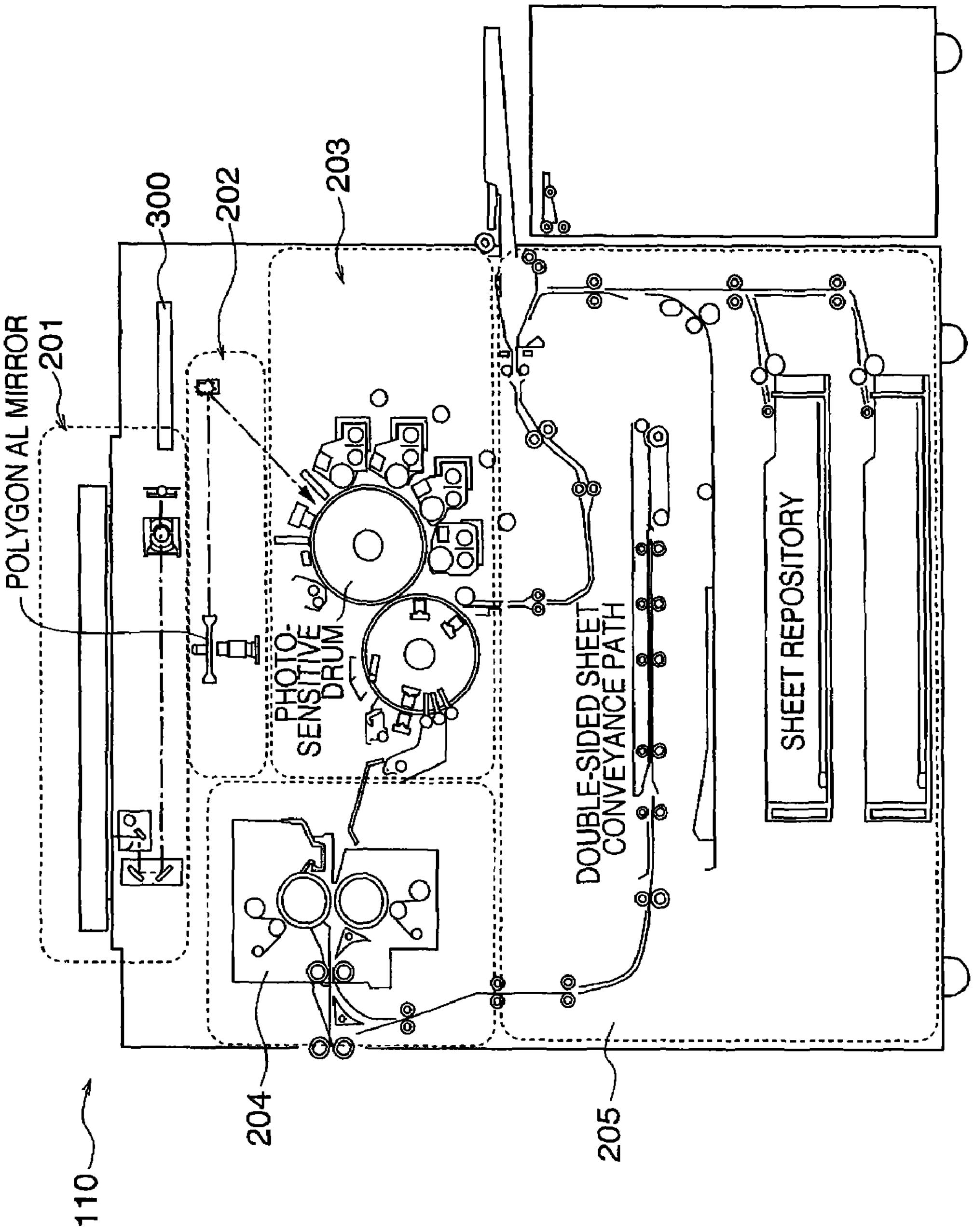
FIG. 2 is a diagram illustrating the internal configuration of an image forming apparatus (Multifunction Peripheral, or MFP) that functions as the workflow executing apparatus according to the embodiment of the present invention.

FIG. 2 is a diagram illustrating the internal configuration of the image forming apparatus (a Multifunction Peripheral, or MFP) 110 that functions as a workflow executing apparatus according to the present embodiment. The example given here is of a 1D color-type MFP that has a single photosensitive drum. There are full-color MFPs, and monochrome MFPs. Aside from color processing, internal data, and so on, the basic structure of a monochrome MFP is often included within a full-color MFP, and therefore the following descriptions shall focus mainly on full-color MFPs.

The image forming apparatus 110 is provided with a scanner unit 201, a laser exposure unit 202, an image forming unit 203 that includes the photosensitive drum, a fixing unit 204, a feed/conveyance unit 205, and a controller 300, which shall be described later, for controlling the aforementioned constituent elements.

The scanner unit 201 irradiates light from a light source onto a document placed on a platen glass, optically reads the document based on the reflected light, and converts the optical image into an electric signal, thereby generating image data. The laser exposure unit 202 causes a beam of laser light modulated in accordance with the image data to enter into a rotating polygonal mirror rotating at an isometric speed, and the light reflected from the rotating polygonal mirror is irradiated so as to scan the surface of the photosensitive drum.

The image forming unit 203 rotates the photosensitive drum, and develops using toner a latent image formed by the laser light from the laser exposure unit 202 on the surface of the photosensitive drum, which has been evenly charged by a charger. Then, an electrophotographic process, in which the toner image is transferred onto a sheet by a nip between the photosensitive drum and a transfer drum, thereby forming an image, and the minute pieces of toner remaining untransferred on the photosensitive drum are collected, is executed. At this time, the sheet is wrapped around the transfer drum at a predetermined position, and the transfer drum makes four rotations. During this interval, the stated electrophotographic process is sequentially repeated, switching off between developing units (developing stations) having magenta (M), cyan (C), yellow (Y), and black (K) toners, respectively. The sheet onto which this four-color, full-color toner image has been transferred leaves the transfer drum and is conveyed to the fixing unit 204. The fixing unit 204 is configured of a combination of rollers, belts, and the like, and is provided with a heat source such as a halogen heater or the like. Using heat and pressure, the fixing unit 204 fuses and fixes the toner on the sheet, to which the toner image has been transferred by the image forming unit 203.

The feed/conveyance unit 205 includes at least one sheet repository, such as a sheet cassette or a paper drawer. In response to an instruction from the controller 300, the feed/conveyance unit 205 separates a single sheet from a plurality of sheets stored in the sheet repository and conveys that sheet to the image forming unit 203. In the case where the image is to be printed on both sides of the sheet, control is performed so that the sheet that has passed through the fixing unit 204 also passes through a conveyance path that conveys the sheet to the image forming unit 203 a second time. The controller 300 executes overall control of the image forming apparatus 110, and also manages the statuses of the various constituent elements, or the scanner unit, laser exposure unit, image forming unit, fixing unit, and feed/conveyance unit, executing control so that the overall system can maintain harmony and operate smoothly.

Note that the image forming apparatus 110 may be a SFP (Single Function Peripheral)-type image forming apparatus, equipped with only an image forming apparatus and a printing function. Alternatively, the image forming apparatus may be configured of a combination of image forming apparatuses and information processing apparatuses (computers). Meanwhile, in the case where a workflow process that does not require image processing is executed, the workflow executing apparatus may be configured of an information processing apparatus rather than an image forming apparatus. Either configuration may be used as long as the control described in the present embodiment can be implemented.

Figure 3:
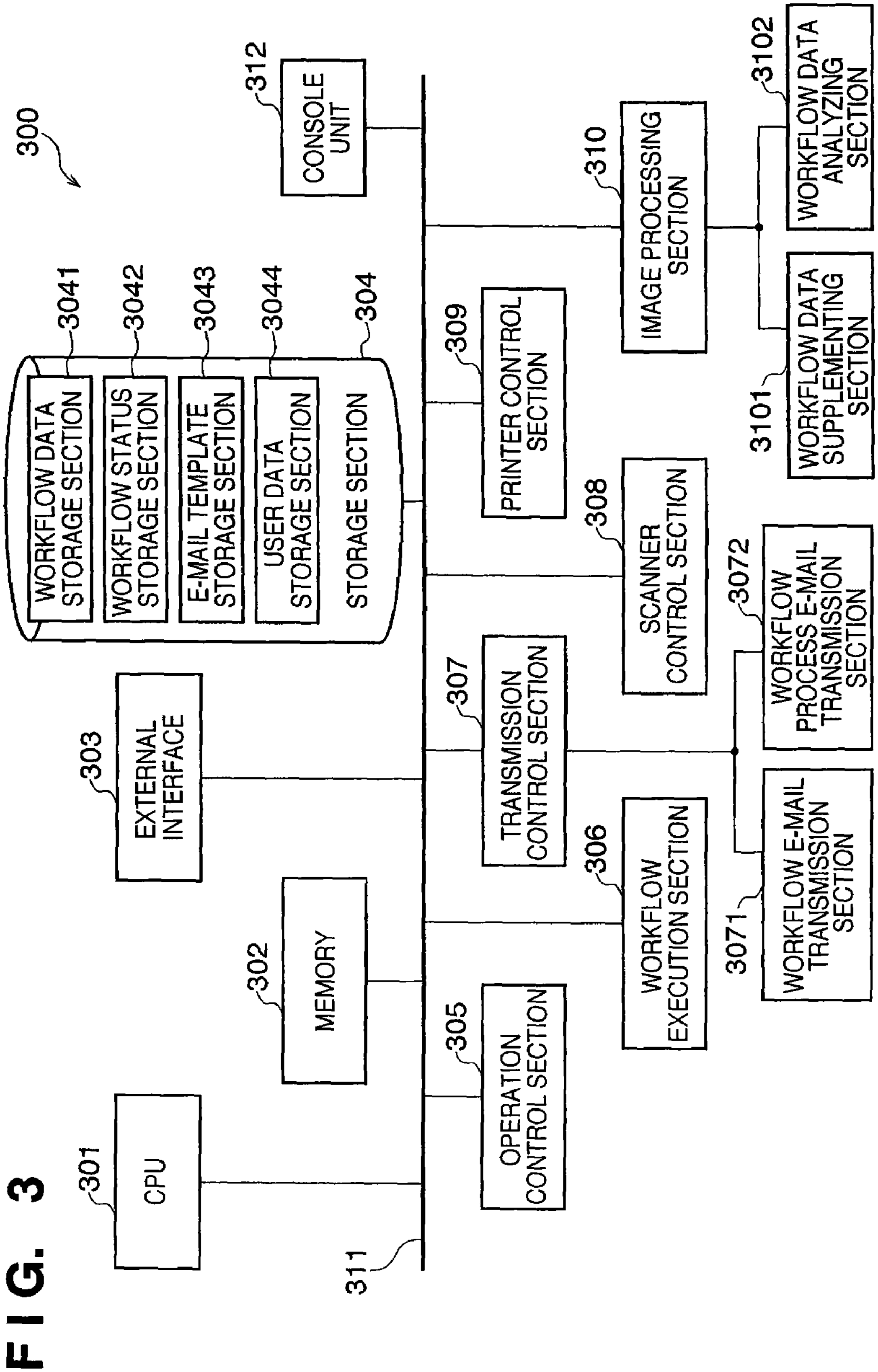
FIG. 3 is a block diagram illustrating the configuration of a controller of an image forming apparatus that includes the workflow executing apparatus according to the embodiment of the present invention.

FIG. 3 is a block diagram illustrating the configuration of the controller 300 of the image forming apparatus 110 that includes the workflow executing apparatus according to the present embodiment.

Reference numerals 305, 306, 307, 3071, 3071, 308 309, 310, 3101 and 3102 denote processing modules that configure the controller 300. These processing modules include an application program implemented by the CPU 301 or a module operating as a part of the program. Reference numerals 304, 3041, 3042, 3042 and 3044 denote data storage sections that store programs and various data of the controller 300 in the image forming apparatus 110 and include a hard disk drive (HDD) and a nonvolatile memory having a file system or a database system. Data stored in the data storage sections 304, 3041, 3042, 3042 and 3044 can be accessed using a predetermined key or in a predetermined condition.

A CPU 301 controls the overall operation of the image forming apparatus 110, and implements scanning, printing, facsimile, and other such functions by reading out a program stored in a memory 302, the storage section 304, or the like, executing the program, and providing instructions to the various constituent elements thereby. The memory 302 includes a ROM for storing various programs executed by the CPU 301, and a RAM for temporarily storing data necessary for performing control and the like. "Various programs" as mentioned here refers to the following, which shall be described later: an operation control section 305; a workflow execution section 306; a transmission control section 307; a workflow e-mail transmission section 3071; and a workflow process e-mail transmission section 3072. "Various programs" also includes the following: a scanner control section 308; a printer control section 309; an image processing section 310; a workflow data supplementing section 3101; and a workflow data analyzing section 3102. An external interface 303 exchanges data with an external image forming apparatus, a user PC, and the like via a network.

The storage section 304 is configured of a non-volatile memory such as a hard disk, and stores control information, setting information, and the like used in various workflow processes, in addition to storing image data and the like generated through various processes. The storage section 304 includes: a workflow data storage section 3041; a workflow status storage section 3042; an e-mail template storage section 3043; and a user data storage section (user memory) 3044. Writing/reading data to/from the storage section 304 is carried out via the memory 302. Note that the various programs may be stored in the storage section 304 rather than in the ROM of the memory 302. Furthermore, the storage section 304 may be present within an external server apparatus (not shown) connected to the network 100 via the external interface 303. A console unit 312 includes a touch panel, various keys, or the like, operated by the user and used for inputting various operational instructions; the console unit 312 also includes a display unit or the like.

Data that configures workflows is registered in the workflow data storage section 3041. The following can be given as examples of workflows executed by the image forming apparatus 110 according to the present embodiment: a bookbinding printing request; a business card printing request; a digitization request for documents; a mass print permission application; a poster creation request; and so on. An ID and display name for identifying the workflow, as well as the number of steps thereof; IDs and display names for identifying each step included in the workflow; the role of the issuer of the workflow; condition branches such as "accepted" or "rejected"; details regarding operations performed in each step; and so on are stored in the workflow data storage section 3041. "Details regarding operations performed in each step" refers to detailed operation settings used in scanning, printing, e-mail and fax transmission, and so on.

FIG. 5 is a diagram illustrating an example of a workflow data table, written in XML format, that shows an example of data stored in the workflow data storage section 3041 according to the present embodiment. Although the "mass print permission application" part of the workflow is expressed in XML format, the data may be in text format and stored in a relational database or the like. A workflow list illustrated in an exemplary "workflow list" screen in FIG. 4, mentioned later, is stored in this workflow data table.

A "workflow" tag 501 indicates the content of the workflow. A "wfid" attribute is an identifier that uniquely defines the workflow; in this example, an identifier "wfid_004" has been assigned. A "caption" attribute expresses the name of the workflow. Here, the name is "mass print permission application". The names displayed as start keys for each workflow in a workflow list 406 in the workflow list screen of FIG. 4, which shall be described later, are taken from this "caption" attribute. A "totalstep" attribute indicates the number of steps that make up the workflow. The workflow illustrated in FIG. 5 is made up of three steps.

An "activity" tag 502 is a child tag of the "workflow" tag 501, and indicates the processing details of the individual steps that make up the workflow. An "actid" attribute is an identifier that uniquely identifies a corresponding step; in this example, an identifier "aid_req_001", which indicates an application request, is assigned. A "role" attribute expresses an authorization that makes it possible to execute the corresponding step. In the example in FIG. 5, this is set to "everyone". This attribute is used to determine whether or not the step can be used, based on authorization data, allocated to users, groups, and the like, that is stored in the user data storage section 3044. The user data storage section 3044 stores at least a user's e-mail address and authorization data in association with that user's identification information. Another "caption" attribute expresses the name of the step. In the example in FIG. 5, this is set to "application". A "step" attribute indicates the order of the plurality of steps that make up the workflow. This is set to "1", which indicates the first step.

An "action" tag 503 is a child tag of the "activity" tag 502; the "action" tag 503 indicates a function type (a "type" attribute) for each process that makes up the corresponding step, such as scanning, transmission, printing, and so on, and also expresses information necessary for each function type. For example, when the "type" attribute is "e-mail" (e-mail transmission), an identifier, "requestor", is assigned to the "to" attribute as the address for that e-mail, and an identifier, "certify_004", is assigned to the "to" attribute as a "mailtype". The corresponding e-mail template stored within the e-mail template storage section 3043 can be cited through this "certify_004" identifier. A "last" attribute 504 being "true" indicates that the e-mail is the final e-mail to be transmitted from the corresponding workflow. A "judge" tag 505 expresses a branch in processing, such as whether to accept or reject. The next activity that is to be proceeded to is expressed through a "nextstep" attribute, which follows the "judge" tag 505. In the example in FIG. 5, it is written that the workflow should move to step 3 upon "accept" being obtained. There are two types of branches in processing: when a single choice is selected from among a plurality of choices; and when plural processes are selected and processed in parallel.

In the "mass print permission application" workflow shown in FIG. 5, it is written that the application request is received in step 1, and when "accept" is obtained in step 2, and printing is performed in step 3. The request source is notified, by e-mail, of authorization, acceptance, rejection, completion, and so on at each step.

The execution status of the workflow is stored in the workflow status storage section 3042. An ID for identifying the executed workflow job, the start time, a workflow ID, a current status (for example, "step 3 of 4"), a "Message-Id" identifier of the transmitted e-mail, and the like are stored in the workflow status storage section 3042.

FIG. 6 is a diagram illustrating an example of a workflow status table stored in the workflow status storage section 3042 according to the present embodiment. This workflow status table is mainly used for managing the execution status of a workflow, with the workflow execution section 306 making registrations therein, as well as updating and referring to the details of the registrations.

In FIG. 6, a flow job ID 601 is a job identifier (identification data) for uniquely identifying the job executed by the workflow, and is issued when the user starts the workflow. A start time 602 holds the date/time at which the workflow is started. A starting user ID 603 holds the ID of the user or group that started the workflow. The identifier held by this starting user ID 603 is an identifier defined by the user data storage section 3044. A flow ID 604 is a workflow identifier for identifying the workflow. The workflow execution section 306 cites the ID stored in the "wfid" attribute in the "workflow" tag 501 found in the workflow data table of FIG. 5 and stores that ID as the identifier in the flow ID 604. A current step 605 holds the number of the step the workflow has progressed to, for a workflow made up of a plurality of steps. If, for example, the content of the current step 605 is "3/5", this indicates that the process has progressed to the third step (the "step" attribute of the workflow data table (FIG. 5)) of a workflow that is made up of a total of five steps (the "totalstep" attribute of the workflow data table). An end status 606 indicates whether the workflow has ended or is still being processed. An end status is stored here, the end status indicating whether the workflow has ended normally ("ok") or if it was rejected ("ng"), or if the workflow was cancelled ("cancel"), and so on. Alternatively, if the process is still being carried out, nothing is written therein. A Message-Id 607 holds an identifier set in the Message-Id field of the e-mail header of the first e-mail transmitted in the workflow (an application confirmation e-mail or the like). References 608 holds an identifier set in the References field of the e-mail header of the second and subsequent e-mails transmitted in the workflow (acceptance confirmation e-mail, end confirmation e-mail, and so on). Job data 609 holds details of the job processed in the workflow. For example, in the case of a printing request, print job parameters (for example, A4 size, color, 100 copies (a4/cl/100) or the like) are set therein. In FIG. 6, 610 indicates the status of the workflow indicated in the workflow data table of FIG. 5 (with a flow ID of "wfid_004").

Template data for creating various e-mails transmitted by the transmission control section 307 throughout the execution of the workflow is stored in the e-mail template storage section 3043. Application e-mails, acceptance e-mails, rejection e-mails, end e-mails, confirmation e-mails, and the like can be given as examples of such e-mails. User information regarding users who use the image forming apparatus 110 that functions as a workflow executing apparatus is registered in the user data storage section 3044. An ID that identifies the user (or group), a username, an e-mail address, the authorization of that user, and so on are stored in the user data storage section 3044. The operation control section 305 controls a touch panel, key input unit, or the like provided in the image forming apparatus 110, and communicates various data resulting from the user operating the touch panel, key input unit, or the like.

Figure 4:
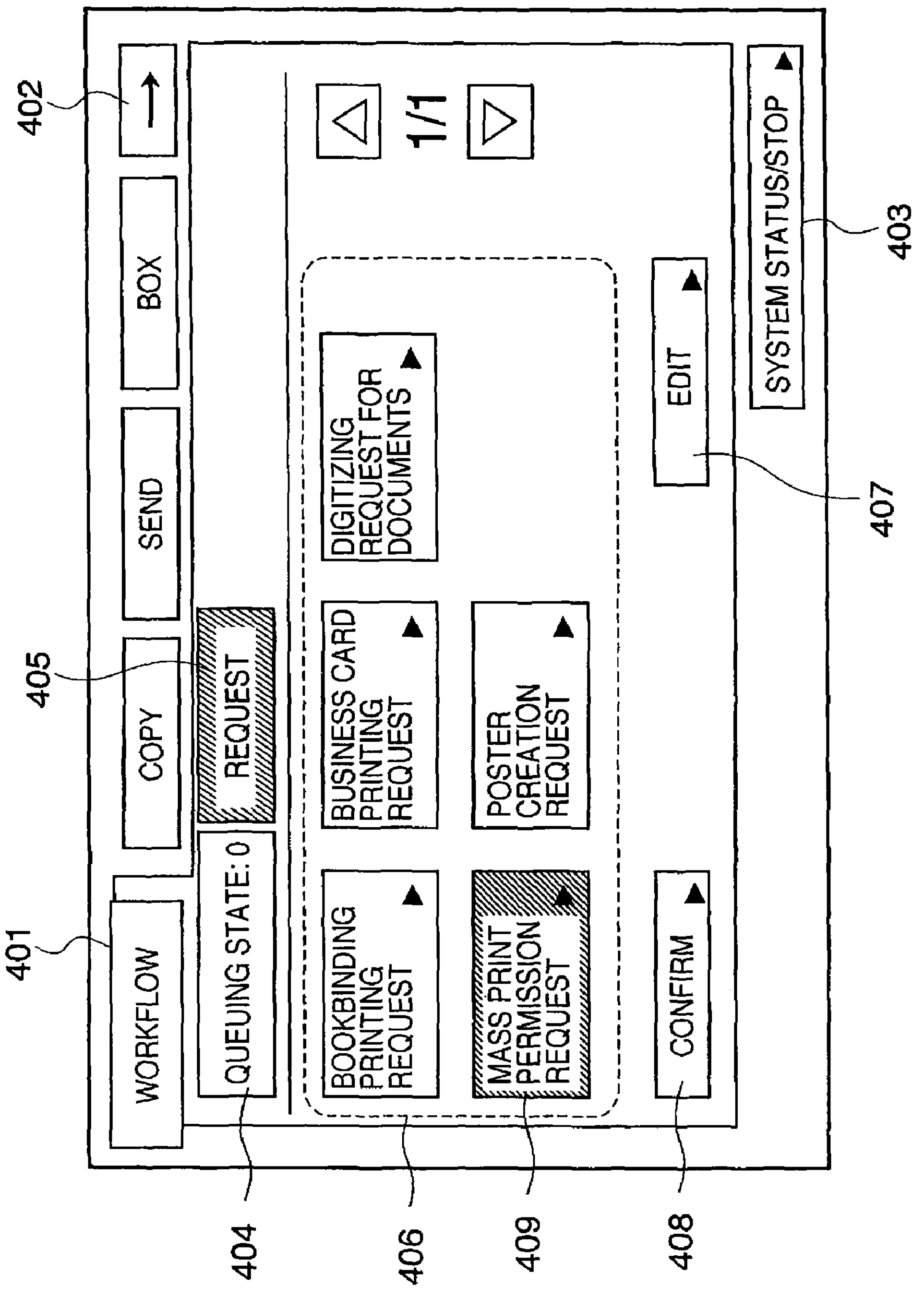
FIG. 4 is a diagram illustrating an example of a "workflow list" screen displayed in a touch panel of a console unit included in the image forming apparatus according to the embodiment of the present invention.

FIG. 4 is a diagram illustrating an example of a "workflow list" screen displayed in the touch panel of the console unit 312 included in the image forming apparatus 110 according to the present embodiment and controlled by the operation control section 305 in response to operations carried out by the user. The touch panel is configured as a touch panel display, having an LCD (liquid-crystal display) and a transparent electrode applied thereupon. The touch panel is programmed with processes for detecting when a portion of the transparent electrode that represents a key displayed on the liquid-crystal display is touched with a finger, and displaying a different console screen corresponding to the specified key.

A workflow tab key 401 is a tab key used by the user to instruct the console screen to transit to a workflow console screen. A transition key 402 is a tab key for instructing the console screen to transit to other operations. A system monitor key 403 is a key for displaying the status, conditions, and so on of the image forming apparatus 110. The user can move between corresponding operational modes by making instructions through the respective tab keys 401, 402, and 403. A queuing state key 404 is a key for displaying, to a user who has logged on to the image forming apparatus 110, a list of workflows that are pending, in the case where workflows from other users that need to be processed are present. The number of workflows that are currently pending is displayed in the queuing state key 404. A workflow request key 405 is a key that displays the workflow list 406, which includes a list of workflows that the user who is logged on to the image forming apparatus 110 can start. A plurality of workflow start keys for instructing the start of various workflows are displayed in the list 406 of plural key items, the display of which is caused by the user pressing the workflow request key 405. A list of the workflows that a user can start is displayed in the workflow list 406 in this manner. Specifying a single workflow start key (workflow item) from the displayed list causes the specified workflow to start. In the example shown in FIG. 4, "bookbinding printing request", "business card printing request", "digitization request for documents", "mass print permission application", and "poster creation request" are displayed in the workflow list 406. Here, when a workflow start key 409 that indicates "mass print permission application" is specified, the "mass print permission application" workflow, described with reference to FIGS. 5 and 6, is started.

An edit key 407 is a key for editing information registered in each workflow start key present in the list 406 displayed as a result of the user pressing the workflow request key 405. When the user presses a workflow start key after pressing the edit key 407, an "edit" screen that shows the details of the workflow corresponding to the pressed workflow start key is displayed, making it possible to edit the registered information, such as the display name, for each workflow. A confirm key 408 is a key for confirming the workflow executed as a result of an instruction from the user. When the confirm key 408 is pressed, a "confirm workflow" screen is displayed, making it possible to confirm the execution status of the workflow based on the data stored in the workflow status storage section 3042.

The workflow execution section 306 executes/controls the workflows stored in the workflow data storage section 3041 based on instructions from the operation control section 305, which has accepted operations performed by the user. Accordingly, the workflow execution section 306 functions as the central control unit of the workflow executing apparatus according to the present embodiment. The workflow execution section 306 controls the execution of the workflow while outputting instructions to the transmission control section 307, the scanner control section 30S, the printer control section 309, the image processing section 310, and so on, ascertaining the executing statuses thereof, and also performs control of the execution of predetermined exceptional processes as well.

The transmission control section 307 controls a transmission application for facsimiles, e-mails, or the like, based on instructions from the operation control section 305, which has accepted operations performed by the user. The transmission control section 307 transmits image data acquired from the memory 302, the storage section 304, and so on to the exterior via the external interface 303; conversely, the transmission control section 307 also receives image data transmitted from the exterior and stores that data in the memory 302, the storage section 304, and so on. It is also possible for the transmission control section 307 to automatically transmit e-mails and the like when the image forming apparatus 110 performs specific operations, as a result of the user performing a setting in advance via the operation control section 305.

The workflow e-mail transmission section 3071 and the workflow process e-mail transmission section 3072 are transmission modules that function as parts of the transmission control section 307 when a workflow is executed based on instructions from the workflow execution section 306. The e-mails transmitted by the workflow e-mail transmission section 3071 and the workflow process e-mail transmission section 3072 are created with reference to the workflow data table of the workflow data storage section 3041, an example of which is illustrated in FIG. 5. In other words, the e-mails are created based on templates taken from the e-mail template storage section 3043, using the identifiers defined in the mail-type in the workflow data table as keys. The workflow e-mail transmission section 3071 transmits e-mails related to the workflow process (application confirmation e-mails and the like) throughout the workflow processes executed based on instructions from the workflow execution section 306. The identifiers set by the workflow e-mail transmission section 3071 as Message-Ids in the e-mail headers of the e-mails are stored in the workflow status table held by the workflow status storage section 3042. In other words, the Message-Ids in the e-mail headers are stored in the Message-Id 607 and References 608 parts of the records in FIG. 6 specified by the flow job ID 601. In the record indicated by 610 in FIG. 6, "wf004-350.001@mfp1.mail.jp" is stored as an example of the e-mail Message-Id corresponding to that shown in the workflow data table of FIG. 5.

The workflow process e-mail transmission section 3072 transmits the second and subsequent e-mails related to the workflow process (acceptance confirmation e-mails, printing end confirmation e-mails, and the like) to be transmitted throughout the workflow processes executed based on instructions from the workflow execution section 306. The identifiers in the References 608 of FIG. 6 are set in the References field of the e-mail headers of the e-mails transmitted by the workflow process e-mail transmission section 3072. In other words, the identifiers stored in the References 608 part of the records specified by the flow job ID 601 in the workflow status table held by the workflow status storage section 3042 are set, and the e-mails are transmitted. The identifiers set by the workflow process e-mail transmission section 3072 as Message-Ids in the e-mail headers of the e-mails are added to the References 608 specified by the flow job ID 601 in the workflow status table. The example shown in FIG. 6 shows a state in which an identifier "wf004-350.002@mfp1.mail.jp" set as the Message-Id of the second e-mail has been newly added to the References 608 part of the record 610.

In such a manner, the e-mails transmitted by the workflow e-mail transmission section 3071 and the workflow process e-mail transmission section 3072 are associated with one another through the e-mail headers (Message-Id and References). E-mails transmitted by processes in the same workflow are received by an e-mail application already installed in the user PC 101. The user therefore displays a list of received e-mails using the e-mail list thread display function, which is a function generally included in the e-mail application. Through this, the e-mail application can associate plural types of e-mails (application confirmation e-mails, acceptance confirmation e-mails, end confirmation e-mails, and so on) received from the same flow job with one another and display them as a series in a thread display. Note that "thread display" refers to a function for displaying an original message and then successively displaying the replies to that original message. Using the thread display function makes it possible for the e-mail application to successively display a plurality of e-mails transmitted from a series of processes in a workflow. The structure of the thread display shall be described hereinafter. In the case where the Message-Id is set in the References of received e-mails, the e-mail application can display the received e-mails and the transmitted e-mails indicated by that Message-Id as a thread.

The workflow process e-mail transmission section 3072 also sets a specific priority value in an extended e-mail header field expressing the importance of the e-mail, in the final e-mail transmitted during the workflow processes executed based on instructions from the workflow execution section 306. For example, a value expressing a "low" importance is set as the X-Priority, X-MSMail-Priority, Importance, Sensitivity, Priority, or the like, after which the e-mail is transmitted. To provide a more specific example, "4" is set as the X-Priority. Having received this e-mail, the e-mail application uses an e-mail importance display function, which is a general e-mail application function, making it possible to visually confirm that the importance is set to "low" through an icon or the like. As part of the functionality of the workflow process e-mail transmission section 3072, the final e-mail transmitted from the workflow is always set to the same "low" importance. For this reason, it is easy for the user to visually confirm that the workflow job has ended, using the e-mail application that is already installed.

The scanner control section 308, which functions as a document reading means, controls the operations of the scanner unit 201. To be more specific, the scanner control section 308 drives the scanner unit 201 in accordance with instructions from the CPU 301, reading a document that has been placed upon the platen glass, and storing the image data of the read document in the memory 302. The printer control section 309 acquires image data from the memory 302, the storage section 304, or the like, controls the laser exposure unit 202, the image forming unit 203, the fixing unit 204, the feed/conveyance unit 205, and so on of a printer unit, and prints an image on a recording sheet, in accordance with instructions from the CPU 301. The image processing section 310 performs image processes, quality enhancement processes, and the like instructed by the user via the operation control section 305, analyzes image data stored in the memory 302 by the scanner control section 308, and so on. The image processing section 310 also converts the resolution, paper size, and so on of the image data to be transmitted during facsimile transmission, in accordance with the capabilities of the destination.

The workflow data supplementing section 3101 and the workflow data analyzing section 3102 are image processing modules that function as parts of the image processing section 310 when a workflow is executed based on instructions from the workflow execution section 306. The workflow data supplementing section 3101 performs processes such as those described hereinafter when the workflow execution section 306 has instructed the printer control section 309 to print/output image data stored in the memory 302 during the workflow process. First, the workflow data supplementing section 3101 cites information linked from the workflow data storage section 3041, the workflow status storage section 3042, and the user data storage section 3044. The workflow data supplementing section 3101 then creates a barcode image that includes workflow information such as identifiers including the flow ID and name of the workflow, the flow job ID, the e-mail address of the user that started the workflow, the Message-Id of the first transmitted e-mail, and so on. The barcode image is outputted together with the printed output, to the user PC, as a coversheet.

In the case where the user wishes to confirm the status of the workflow indicated by the coversheet, the user presses the confirm key 408 in the workflow list screen illustrated in FIG. 4. The "confirm workflow" screen is displayed as a result of the confirm key 408 being pressed, and the printed coversheet is placed on the platen glass and scanned by the scanner unit 201 in accordance with the instructions indicated therein. The image data of a barcode image scanned by the scanner control section 308 based on instructions from the workflow execution section 306 is thus analyzed by the workflow data analyzing section 3102 in such a manner. The workflow data analyzing section 3102 acquires the workflow information embedded in the barcode image (identifiers including the flow ID and name of the workflow, the flow job ID, the e-mail address of the user that started the workflow, the Message-Id of the first transmitted e-mail, and so on).

In this manner, the workflow execution section 306 provides an instruction to the operation control section 305, thereby displaying the workflow information in the "confirm workflow" screen. Next, the workflow execution section 306 transmits a confirmation e-mail to the e-mail address of the user that started the workflow, by providing an instruction to the workflow process e-mail transmission section 3072. The workflow process e-mail transmission section 3072 sets the "Message-Id" identifier of the first e-mail transmitted in the workflow in the References field of the e-mail header of this e-mail.

The e-mail application of the user PC 101, which has received this e-mail, displays a list of received e-mails using the e-mail list thread display function, which is a function generally included in the e-mail application. Through this, the plural types of e-mails (application confirmation e-mails, acceptance confirmation e-mails, end confirmation e-mails, and so on) transmitted from the same workflow as the confirmation e-mail are displayed as a continuous thread. In other words, the user can visually confirm which workflow the printed product outputted along with the previously mentioned cover sheet is associated with by using the systems present in the already-installed e-mail application.

An internal bus 311 connects the various constituent elements to one another; image data is transferred, and instructions, setting values, and the like are transmitted/received between various constituent elements, via this internal bus 311.

Although in the present embodiment, descriptions have been provided regarding the controller 300 of a single image forming apparatus 110 in which the workflow executing apparatus has been applied, it should be noted that a plurality of image forming apparatuses 110 may operate in tandem to control a single workflow. In such a case, the storage section 304 is shared by the plural image forming apparatuses, the workflow execution sections 306 of the plural image forming apparatuses operate cooperatively with one another, and so on, and the workflow is controlled accordingly.

FIG. 7 is a diagram illustrating an example of a conventional e-mail list, in which a series of e-mails transmitted from a workflow executing apparatus are filtered by "subject" and displayed as a received e-mail list so as to be easily distinguishable in the e-mail application installed in a user PC 101.

As can be seen in this example, it is difficult to determine at a glance the type and the time/date (or time/date continued from) of the workflow that the e-mails received from a workflow belong to. Thus, it goes without saying that it is even more difficult to associate workflows with e-mails using the e-mail application when, for example, a user has received many e-mails resulting from processing a plurality of workflows in parallel, when a large amount of time is required for a single workflow to complete, and so on.

As opposed to this, FIG. 8 is a diagram illustrating an example of a display of an e-mail list, in which e-mails from a serial workflow transmitted from a workflow executing apparatus according to the present embodiment are displayed using a thread display function of an e-mail application installed in the user PC 101. For ease of explanation, the same series of e-mails as shown in FIG. 7 are also displayed here.

In FIG. 8, e-mails transmitted from a workflow are associated with the same workflow and displayed, as shown by the thread display indicated by the numeral 801. For this reason, it is easy to visually determine the type and the time/date (or time/date continued from) of the workflow that the e-mails received from a workflow belong to. Furthermore, the final e-mail transmitted from a serial workflow is displayed with a mark 802, indicating a fixed importance, being added thereto. Hence, the user can easily determine whether a workflow displayed in the e-mail list of the e-mail application is still being processed or has ended.

In FIG. 8, the details indicated by the numeral 803 show that the e-mails received throughout a workflow (mass print permission) with a "wfid" attribute of "wfid_004", in which the workflow has been applied for, accepted, and the printing specified therein has ended, are displayed altogether in time-series form.

Meanwhile, the structure of a workflow often splits into plural branches partway through, and the branches are processed in parallel starting partway through. In cases like this, when e-mails from such a workflow are displayed as a thread in the e-mail application installed in the user PC 101, the thread is displayed as a tree structure, with the thread display 801 branching out partway through. In this case, the branch is expressed by the "judge" tag 505 in the workflow data table illustrated in FIG. 5. Then, separate tables may be prepared in the workflow status table illustrated in FIG. 6, with the branches of the workflow that has branched being managed in the separate tables. Alternatively, a branch relationship item expressing the relationship between the original flow from which the branches split off and the branch flows may be added to the items in the workflow status table, and new records may be added for the branch flows. Any method may be used as long as the continuity of the workflow and the status thereof can be managed. Regardless of the method, the Message-Id 607 and the References 608 items are carried over in this case. Accordingly, when e-mails from the workflow are displayed as a thread in the e-mail application of the user PC 101, the thread is displayed as a tree structure, with the thread branching out partway through.

Figure 9:
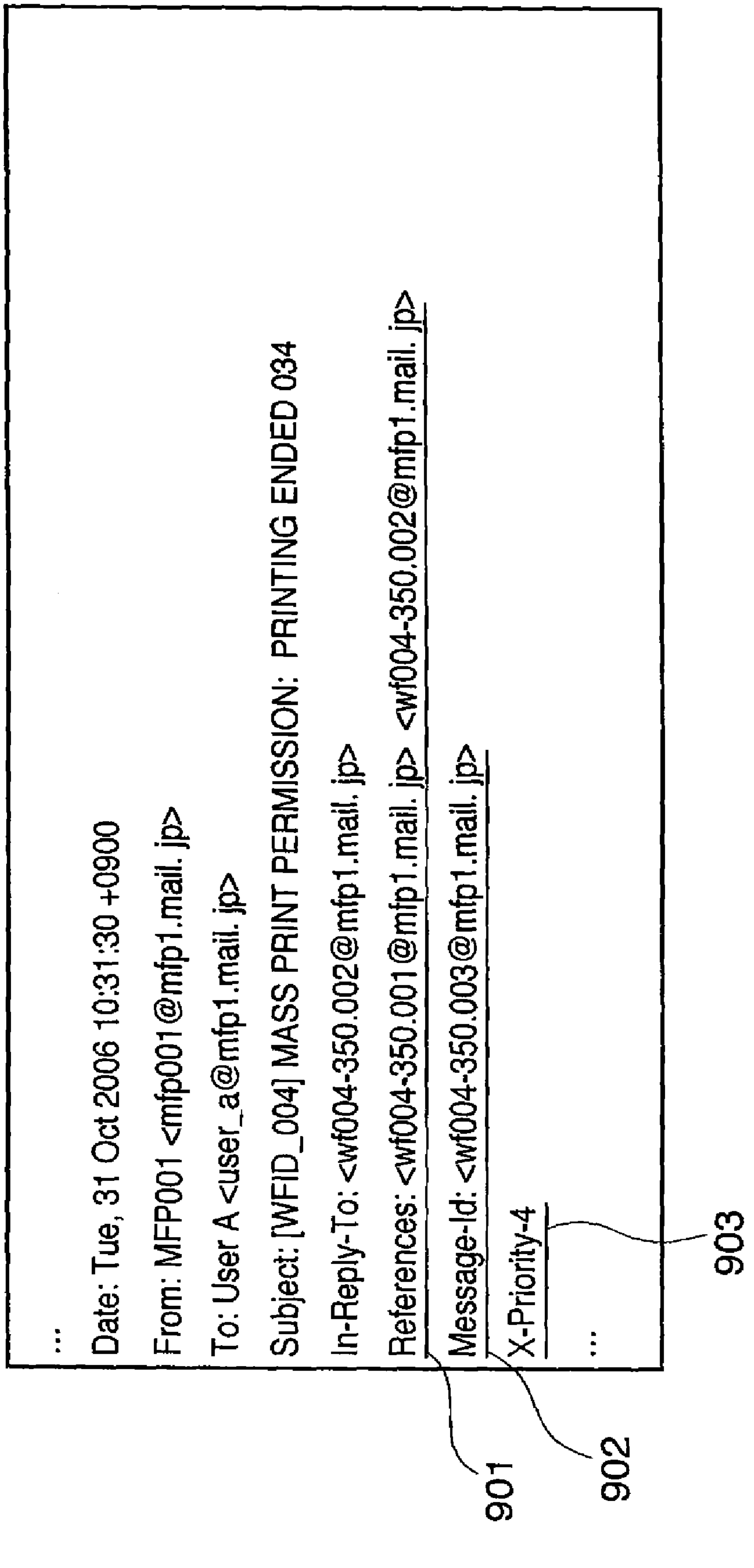
FIG. 9 is a diagram illustrating an example of an e-mail header of an e-mail (print end notification e-mail) from a serial workflow (mass print permission) transmitted from the workflow executing apparatus according to the embodiment of the present invention and received by a user PC.

FIG. 9 is a diagram illustrating an example of an e-mail header of an e-mail (print end notification e-mail) from a workflow (mass print permission) transmitted from the workflow executing apparatus according to the present embodiment and received by the user PC 101.

References 901 is an e-mail header indicating the relationship between the present e-mail and the e-mails transmitted prior to the present e-mail (application reception notification e-mail, print instruction e-mail) in the workflow. The identifier set in References 901 is cited from, for example, the Reference 608 in the workflow status table illustrated in FIG. 6, and set. In other words, here, the identifier "wf004-350.002@mfp1.mail.jp" of the second e-mail (the following e-mail) is added to the identifier "wf004-350.001@mfp1.mail.jp" in the Message-Id of the first e-mail, in accordance with FIG. 6.

Message-Id 902 is an e-mail header that uniquely identifies that e-mail. The identifier set in the Message-Id 902 is stored in References 608 in the workflow status table, and is cited by the References 901 of the e-mail transmitted next. This makes it possible to express the relationship between e-mails transmitted in the present workflow.

X-Priority 903 is an extended e-mail header indicating the priority of the e-mail. "4", indicating a low priority, is set here. The e-mail application of the user PC 101 refers to the value of this X-Priority 903 and displays a priority icon. Here, because the final e-mail from a workflow is always set with the same importance, the user can use the installed e-mail application to visually confirm that the workflow job has ended.

Next, the processing performed by the image forming apparatus 110, to which the workflow executing apparatus of the present embodiment has been applied, shall be described with reference to the previously mentioned diagrams as well as the flowcharts in FIGS. 10 and 11.

Figure 10A:
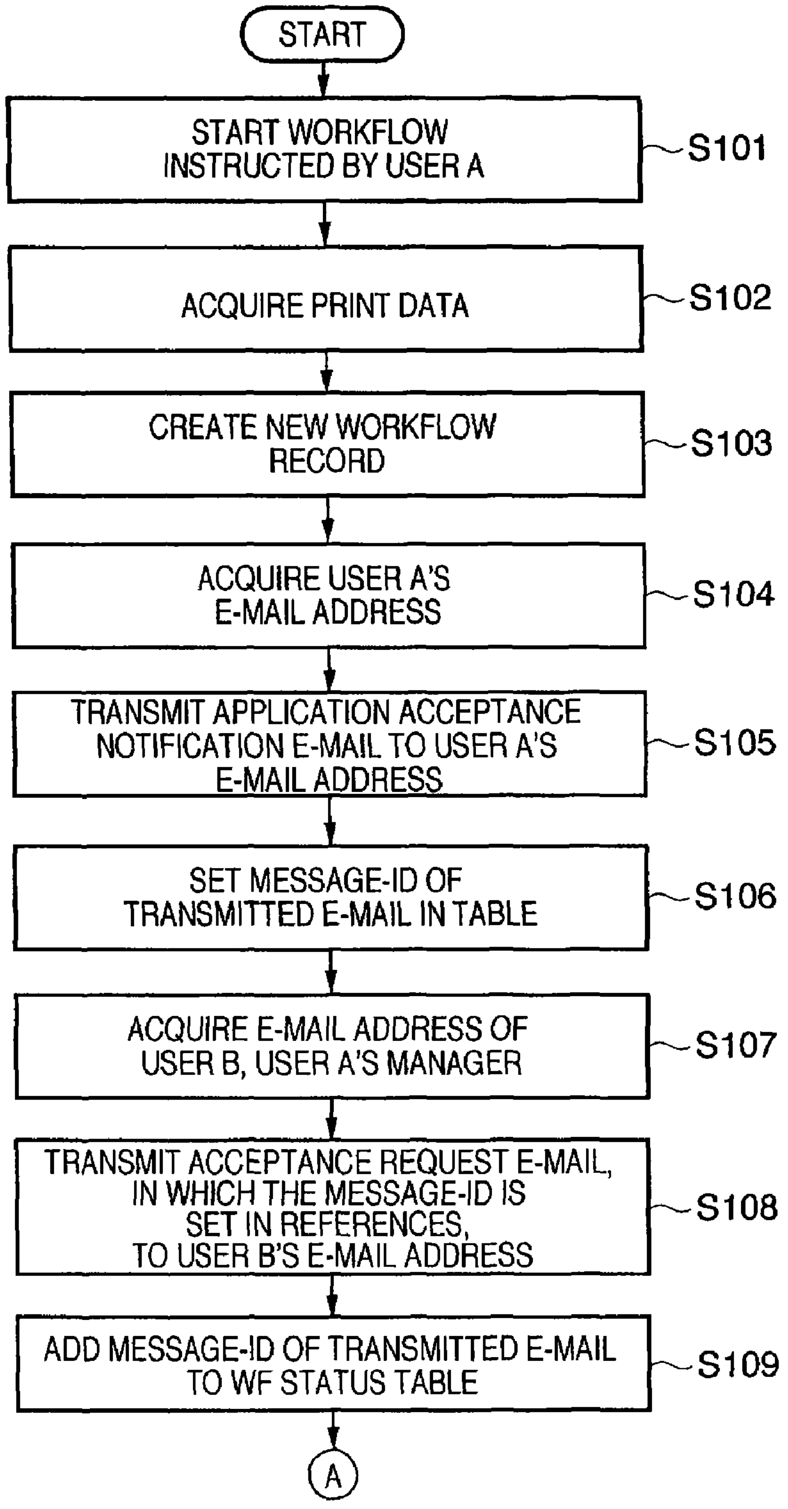
FIGS. 10A and 10B are flowcharts illustrating processing performed by the image forming apparatus according to the embodiment of the present invention.
Figure 10B:
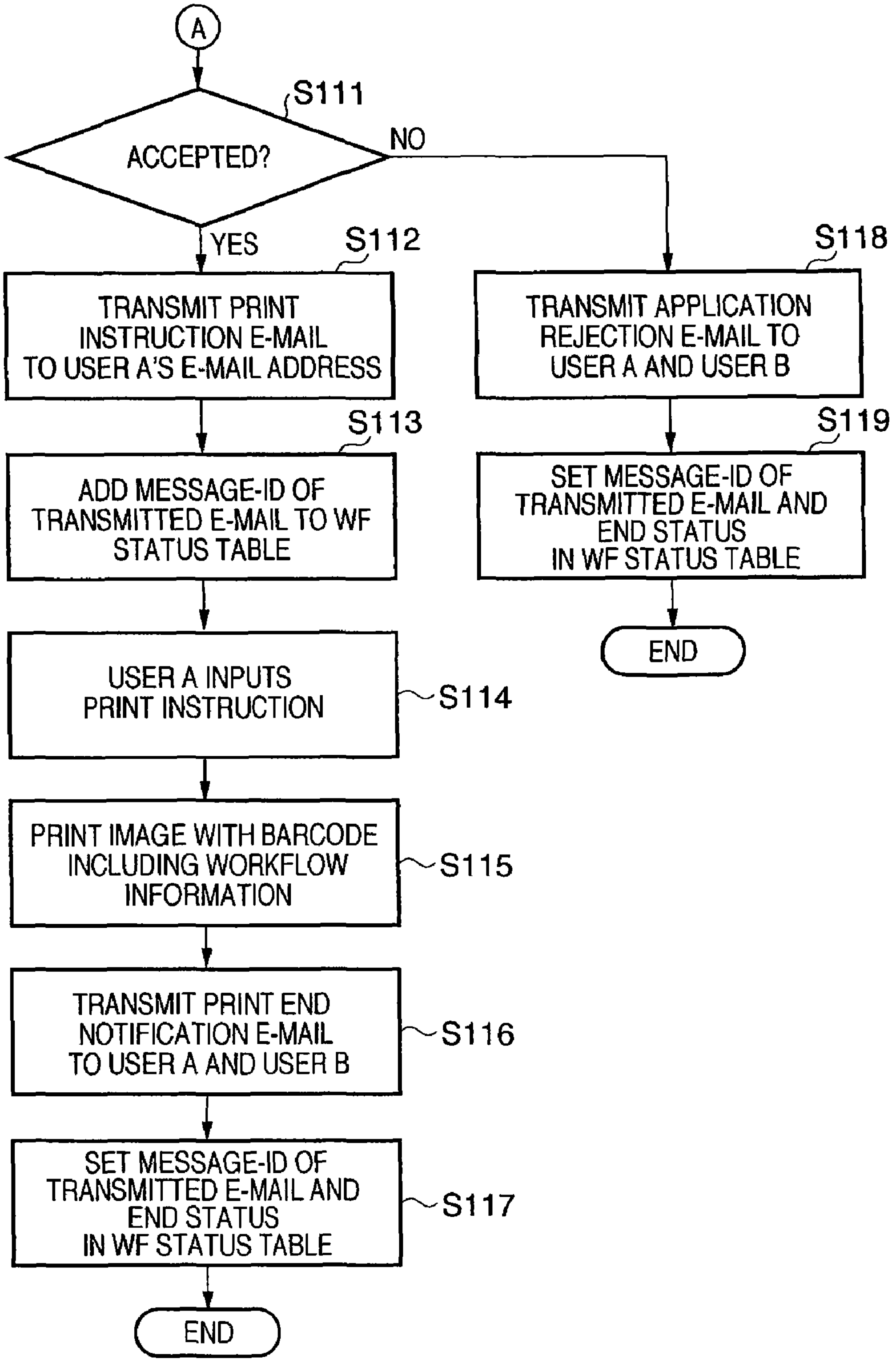
Figure 11:
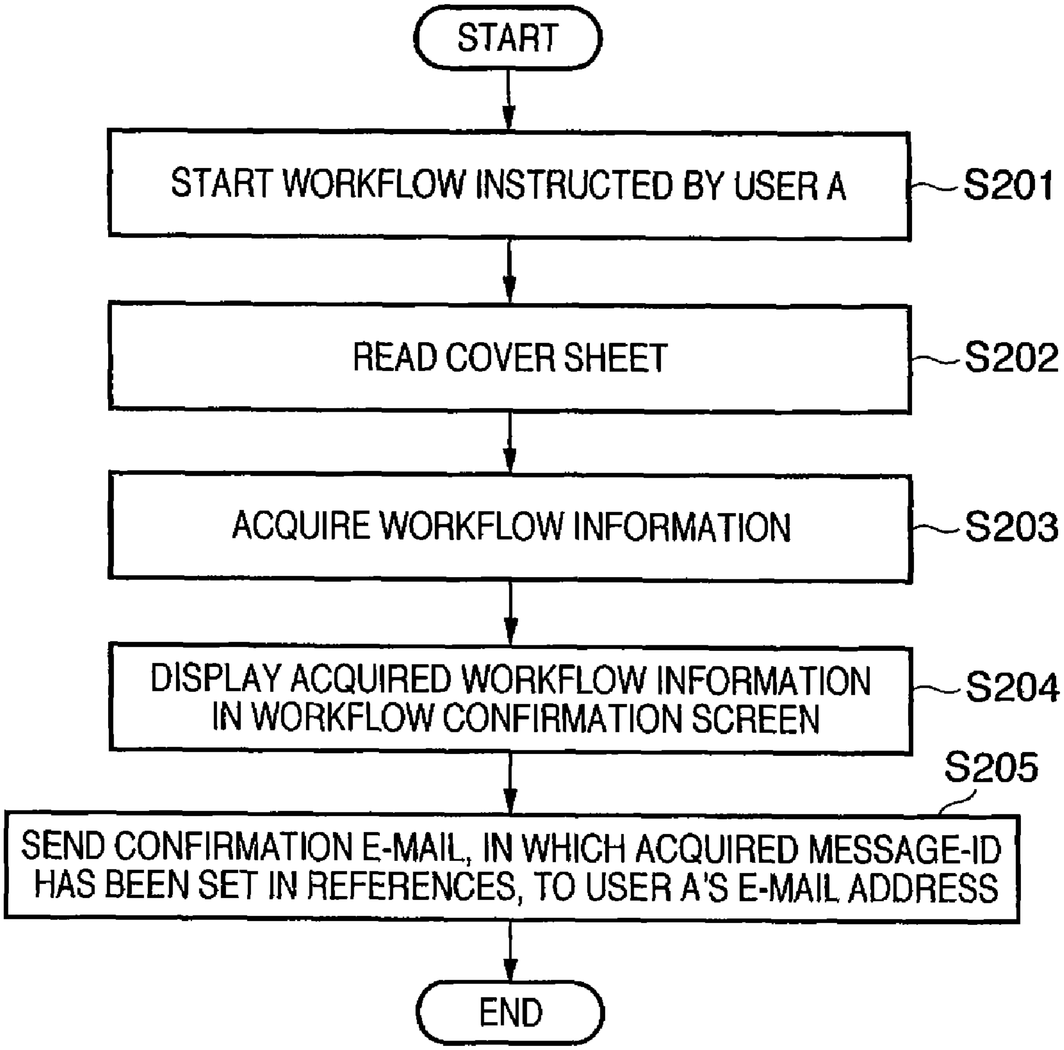
FIG. 11 is a flowchart illustrating a confirmation flow for confirming a step of a workflow using a coversheet of image data printed in Step S115 of FIG. 10B.

FIGS. 10 and 11 are flowcharts illustrating processing performed by the image forming apparatus according to the present embodiment. Note that the program that executes these processes is stored in the memory 302 at the time of execution, and is executed under the control of the CPU 301. Furthermore, the flowcharts in FIGS. 10A and 10B shall be described using a "mass print permission application", in which an application is required for mass-printing to be carried out, as an example. However, before describing these flowcharts, an outline of the "mass print permission application" workflow shall be provided with reference to FIG. 12.

Figure 12:
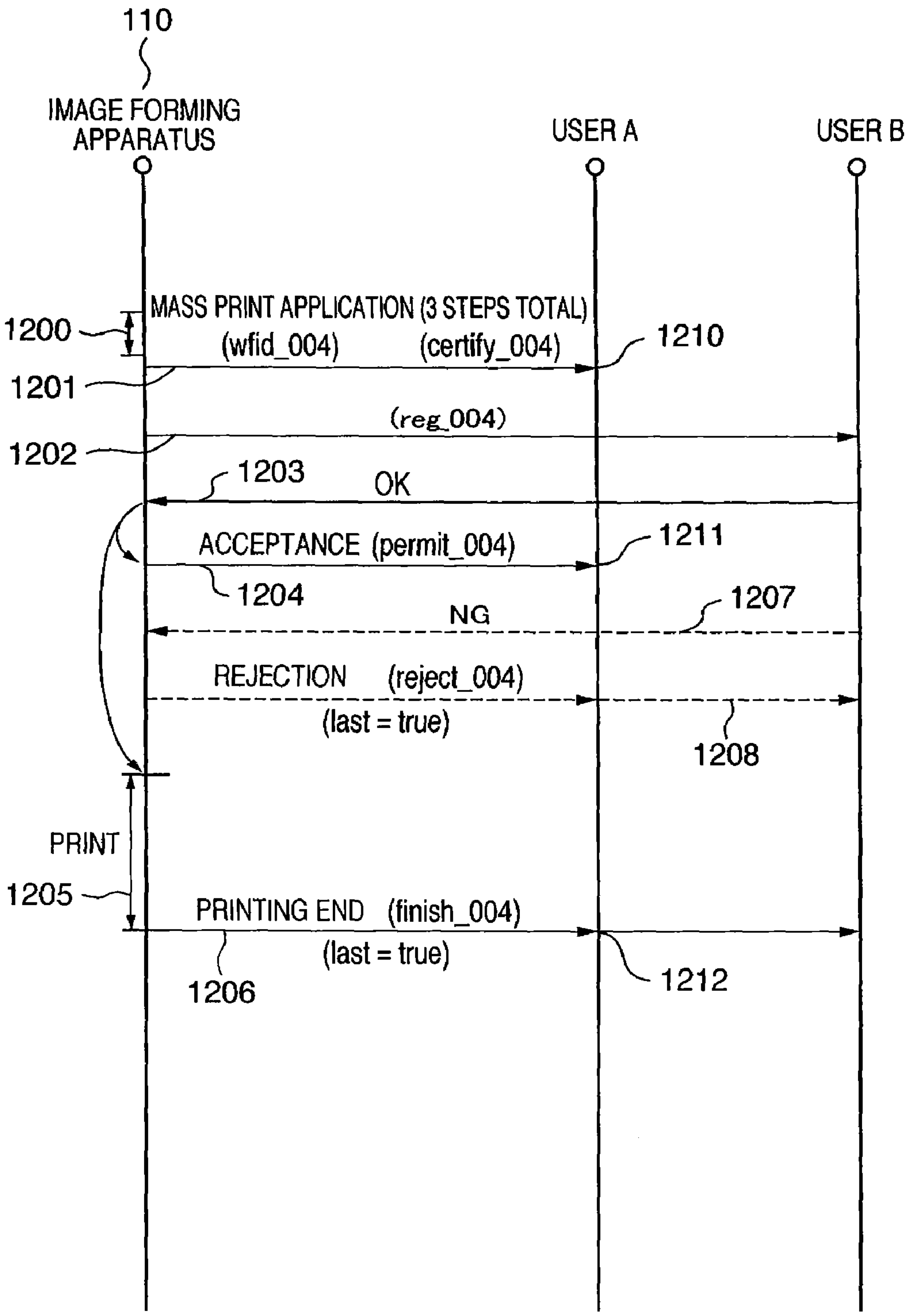
FIG. 12 is a diagram illustrating the exchange of e-mails in a workflow system that includes the workflow executing apparatus according to the embodiment of the present invention.

FIG. 12 is a diagram illustrating the exchange of e-mails in a workflow system that includes the workflow executing apparatus according to the present embodiment. This process flow uses the details of the workflow data table illustrated in FIG. 5 as an example. At 1210 to 1212 shown in FIG. 12, the list of e-mails received by a user A's PC is equivalent to the e-mail list indicated by 803 in FIG. 8.

(1) At 1200 in FIG. 12, the user A uses a print permission application screen in the image forming apparatus 110 to store print data in a box and to apply for permission to mass-print that print data. As a result, at 1201, the image forming apparatus 110 notifies the user A's PC via e-mail that there has been an application for permission of mass-printing.

(2) Upon accepting the application for mass-printing, at 1202, the image forming apparatus 110 transmits an acceptance request e-mail to a user B's PC, the user B being the manager (superior) of the user A.

(3) In response to this, at 1203, the user B uses the PC to receive and confirm the application and accept the print.

(4) At 1204, the image forming apparatus 110 transmits an e-mail to the user A's PC, permitting the print.

(5) Next, when the user A instructs the image forming apparatus 110 to execute the print, at 1205, the image forming apparatus 110 prints the print data held in the box.

(6) When the printing ends, at 1206, the image forming apparatus 110 notifies the user A and the user B via e-mail that the printing has ended.

(7) However, if the user B uses the PC to receive and confirm the application, but does not accept the print, at 1207, a rejection message is communicated to the image forming apparatus 110.

(8) Accordingly, at 1208, the image forming apparatus 110 notifies the PCs of the user A and the user B that the application has been rejected (reject_004).

Hereinafter, descriptions shall be provided with reference to the flowcharts in FIGS. 10A and 10B.

First, in Step S101, the image forming apparatus 110 confirms that the "mass print permission application" key 409 in the workflow list 406 specified via the touch panel of the console unit 312 has been pressed by the logged-on user A. As a result, the mass print permission application screen is displayed, and the user A performs operations based on this screen so as to apply for the print permission. Accordingly, the workflow execution section 306 then acquires the processing details of the "mass print permission application" workflow (1200 in FIG. 12) from the workflow data storage section 3041, per workflow step.

Next, the procedure advances to Step S102, where the image forming apparatus 110 confirms that a scanning instruction has been inputted by the user A. Then, under the control of the scanner control section 308, the image forming apparatus 110 uses the scanner unit 201 and commences reading of the document, creates image data based on the read document, and temporarily holds that image data in the memory 302. After that, the workflow execution section 306 stores the image data in an image storage region of the storage section 304 (for example, a "box 03", as indicated by "boxno=03" in FIG. 5).

The procedure then advances to Step S103, where the workflow execution section 306 sets a new flow job ID ("f_350", in the example in FIG. 6) in the workflow status table (FIG. 6), and adds a new record 610 for the workflow job. After this, the procedure advances to Step S104, where the workflow execution section 306 acquires the e-mail address of the applicant, or the user A, from the user data storage section 3044, based on the ID information obtained when the user A logged on to the system.

Next, the procedure advances to Step S105, where the workflow execution section 306 acquires the identifier of the type of e-mail (mailtype) to be transmitted (for example, "certify_004") from the process (action) tag of the corresponding workflow in the workflow data table shown in FIG. 5. The workflow execution section 306 then instructs the workflow e-mail transmission section 3071 to transmit an e-mail, along with providing the stated identifier. As a result, the workflow e-mail transmission section 3071 uses that identifier as a key and acquires the "application reception notification e-mail" template from the e-mail template storage section 3043. The workflow e-mail transmission section 3071 then creates an e-mail message based on the acquired "application reception notification e-mail" template, and transmits the resulting "application reception notification e-mail" to the user A's e-mail address (1201 in FIG. 12).

Next, the procedure advances to Step S106, where the workflow execution section 306 acquires the identifier set in the Message-Id field of the "application reception notification e-mail" transmitted in Step S105 (for example, "wf004-350.001@mfp1.mail.jp"). That identifier is then set in the Message-Id 607 and the References 608 of the record 610 that has the flow job ID "f_350" in the status table shown in FIG. 6. Next, the procedure advances to Step S107, where the workflow execution section 306 acquires the e-mail address of the user B, who is the manager of the user A, from organizational information stored in the user data storage section 3044. The procedure then advances to Step S108, where the workflow execution section 306 acquires the identifier of the type of e-mail (mailtype) to be transmitted (for example, "req_004") from the process (action) tag ("email" to "superior") of the workflow in the workflow data table shown in FIG. 5. The workflow execution section 306 then instructs the workflow process e-mail transmission section 3072 to transmit an e-mail, along with providing the stated identifier. As a result, the workflow process e-mail transmission section 3072 uses that identifier as a key and acquires the "acceptance request e-mail" template from the e-mail template storage section 3043. The workflow process e-mail transmission section 3072 then acquires the identifier ("wf004-350.001@mfp1.mail.jp") stored in the Reference 608 of the record 610 that has the flow job ID "f_350" in the status table shown in FIG. 6. Then, the workflow process e-mail transmission section 3072 creates an e-mail message based on the acquired "acceptance request e-mail" template. The workflow process e-mail transmission section 3072 furthermore sets the identifier acquired from the References 608 ("wf004-350.001@mfp1.mail.jp") in the References field of the e-mail header, and transmits the "acceptance request e-mail" to the user B's e-mail address (1202 in FIG. 12).

Next, the procedure advances to Step S109, where the workflow execution section 306 acquires the identifier set in the Message-Id field of the "acceptance request e-mail" transmitted in Step S108 (for example, "wf004-350.002@mfp1.mail.jp"). That identifier is then added to the References 608 of the record 610 that has the aforementioned flow job ID "f_350" (see FIG. 6). At this time, the workflow execution section 306 also advances the current step 605, which indicates what number step in the workflow the current step is, from "0/3" to "1/3".

Next, upon receiving a response to the acceptance request from the user B's PC (1203 in FIG. 12), to which the acceptance request e-mail was transmitted in Step S108, the image forming apparatus 110 determines whether or not the printing application has been accepted (Step S111 in FIG. 10B). The procedure advances to Step S112 if it has been determined that the application has been accepted, whereas the procedure advances to Step S118 if the printing application has been rejected.

In Step S112, the workflow execution section 306 acquires the identifier of the type of e-mail (mailtype) to be transmitted (for example, "permit_004") from the corresponding process (action) tag in, for example, the workflow data table shown in FIG. 5. This is because in the example shown in FIG. 5, it is specified that the process is to advance to transmitting an e-mail to the user A upon the application being permitted, as indicated by judge type="ok" and nextstep="3" in 505. At this time, the workflow execution section 306 acquires the e-mail address of the applicant, or the user A, from the user data storage section 3044. The workflow execution section 306 then instructs the workflow process e-mail transmission section 3072 to transmit an e-mail, along with providing the stated identifier. As a result, the workflow process e-mail transmission section 3072 uses that identifier as a key and acquires the "print instruction e-mail" template from the e-mail template storage section 3043. The workflow process e-mail transmission section 3072 then acquires the identifiers stored in the Reference 608 of the record 610 that has the flow job ID "f_350" in the workflow status table shown (FIG. 6). In other words, in FIG. 6, the identifiers "wf004-350.001@mfp1.mail.jp" and "wf004-350.002@mfp1.mail.jp" are acquired. Then, the workflow process e-mail transmission section 3072 creates an e-mail message based on the acquired "print instruction e-mail" template. The workflow process e-mail transmission section 3072 then sets the identifiers acquired from the References 608 in the References field of the e-mail header. In other words, the identifiers "wf004-350.001@mfp1.mail.jp" and "wf004-350.002@mfp1.mail.jp" are set in the References field. This e-mail is then transmitted to the user A's address as a "print instruction e-mail" (1204 in FIG. 12).

Next, the procedure advances to Step S113, where the workflow execution section 306 acquires the identifier set in the Message-Id field of the "print instruction e-mail" transmitted in Step S112 (for example, "wf004-350.003@mfp1.mail.jp"). This is then added to the References 608 in the record 610 that has a flow job ID of "f_350" in the workflow status table (FIG. 6). The workflow execution section 306 also advances the current step 605 by one step, to "2/3".

The e-mail application of the user A's PC receives the "print instruction e-mail" transmitted in Step S112. As a result, the user A logs on to the image forming apparatus 110 in accordance with the details written in that e-mail, and presses the queuing state key 404 of the workflow list screen shown in FIG. 4. In response to this, the image forming apparatus 110 displays an "queuing job confirmation screen", and the user confirms the details of that workflow job (f_350). Then, in response to the user A pressing an "execute" button in the "queuing job confirmation screen", the image forming apparatus 110 confirms that print execution has been instructed with regards to the job (f_350). In this manner, in Step S114, the image forming apparatus 110 is inputted with a print instruction by the user A.

Next, the procedure advances to Step S115, where the workflow execution section 306 instructs the printer control section 309 to print the image data stored in "box 03", in accordance with job information stored in job information 609 in the workflow status table. Prior to the image data being printed, the workflow execution section 306 instructs the workflow data supplementing section 3101 in the following manner. First, the workflow data supplementing section 3101 acquires information related to the workflow data storage section 3041, the workflow status storage section 3042, and the user data storage section 3044. The workflow data supplementing section 3101 then creates a barcode image that includes workflow information such as identifiers including the flow ID and name of the workflow, the flow job ID, the e-mail address of the user that started the workflow, the Message-Id of the first transmitted e-mail, and so on. Then, the workflow execution section 306 instructs the printer control section 309 to print the barcode image as a cover sheet along with the image data when the image data is to be printed.

The procedure then advances to Step S116, where the workflow execution section 306 acquires the identifier of the type of e-mail (mailtype) to be transmitted (for example, "finish_004") from the corresponding process (action) tag in the workflow data table shown in FIG. 5. Furthermore, the identifier (last="true"), which indicates that this e-mail is the final e-mail in the workflow, is acquired. Moreover, the workflow execution section 306 acquires the e-mail addresses of the applicant, or the user A, and the acceptor, or the user B, from the user data storage section 3044. The workflow execution section 306 then instructs the workflow process e-mail transmission section 3072 to transmit the final e-mail, along with providing the stated identifier. Accordingly, the workflow process e-mail transmission section 3072 uses that identifier as a key and acquires the "print end notification e-mail" template from the e-mail template storage section 3043. The workflow process e-mail transmission section 3072 then acquires the identifiers ("wf004-350.001@mfp1.mail.jp", "wf004-350.002@mfp1.mail.jp", "wf004-350.003@mfp1.mail.jp") stored in the References 608 of the record 610 that has the flow job ID "f_350" in the workflow status table. Then, the workflow process e-mail transmission section 3072 creates an e-mail message based on the acquired "print end notification e-mail" template. The workflow process e-mail transmission section 3072 then sets the identifiers acquired from the References 608 ("wf004-350.001@mfp1.mail.jp", "wf004-350.002@mfp1.mail.jp", "wf004-350.003@mfp1.mail.jp") in the References field of the e-mail header. Furthermore, the workflow process e-mail transmission section 3072 sets "4", indicating that the importance is "low", in the X-Priority field, which is an extended e-mail header, upon being instructed that the e-mail is the last e-mail to be transmitted. Then, the workflow process e-mail transmission section 3072 transmits the created "print end notification e-mail" to the e-mail addresses of the users A and B (1206 in FIG. 12).

Next, in Step S117, the workflow execution section 306 acquires the identifier set in the Message-Id field of the "print end notification e-mail" transmitted in Step S116 (for example, "wf004-350.004@mfp1.mail.jp"). This identifier is then added to the References 608 in the record 610 that has a flow job ID of "f_350" in the workflow status table. The workflow execution section 306 also moves the value of the current step 605, indicating the order of the steps, by one step, to "3/3", and sets "ok", indicating that the flow has ended normally, in end status 606. The process of the workflow instructed by the user A ends in this manner.

However, if print acceptance has not been obtained in Step S111 (1207 in FIG. 12), the procedure advances to Step S118. There, the workflow execution section 306 acquires the identifier of the type of e-mail (mailtype) to be transmitted (for example, "reject_004") as indicated by the judge type="ng" in the corresponding process (action) tag in the workflow data table shown in FIG. 5. Furthermore, (last="true"), which indicates that this e-mail is the final e-mail in the workflow, is acquired. The workflow execution section 306 also acquires the e-mail addresses of the applicant being the user A, and the manager being the user B (who rejected the print) from the user data storage section 3044. The workflow execution section 306 then instructs the workflow process e-mail transmission section 3072 to transmit the final e-mail, along with providing the identifier acquired as mentioned earlier. Accordingly, the workflow process e-mail transmission section 3072 uses that identifier as a key and acquires an "application rejection e-mail" template from the e-mail template storage section 3043. The workflow process e-mail transmission section 3072 then acquires the identifiers ("wf004-350.001@mfp1.mail.jp", "wf004-350.002@mfp1.mail.jp") stored in the References 608 of the record 610 that has the flow job ID "f_350" in the workflow status table. Then, the workflow process e-mail transmission section 3072 creates an e-mail message based on the acquired "application rejection e-mail" template. Then, the identifiers acquired from the References 608 ("wf004-350.001@mfp1.mail.jp", "wf004-350.002@mfp1.mail.jp") are set in the References field of the e-mail header. Furthermore, the workflow process e-mail transmission section 3072 sets "4", indicating that the importance is "low", in the X-Priority field, which is an extended e-mail header, upon being instructed that the e-mail is the last e-mail to be transmitted. Then, the workflow process e-mail transmission section 3072 transmits the created "application rejection e-mail" to the users A and B (1208 in FIG. 12).

Next, the procedure advances to Step S119, where the workflow execution section 306 acquires the identifier set in the Message-Id field of the "application rejection e-mail" transmitted in Step S118 ("wf004-350.003@mfp1.mail.jp"). This identifier is then added to the References 608 in the record 610 that has a flow job ID of "f_350" in the workflow status table. The workflow execution section 306 then moves the number of the current step 605 by one step, to "3/3", and sets "ng", indicating rejection, in end status 606. The processing for the case where printing has been rejected ends in this manner.

In this manner, in the present embodiment, when a serial workflow for applying for printing permission is carried out, the e-mail headers (Message-Id, References) of plural e-mails transmitted to the user A, who made the application, an the user B, who is the manager, are associated with one another. The users A and B then use an e-mail application already installed in their respective PCs to display the received plural e-mails as a thread display, which is a general function of the stated e-mail application. Accordingly, related e-mails are associated with one another and displayed, as illustrated in, for example, FIG. 8.

Furthermore, in the present embodiment, a valued indicating "low" importance is set in the extended e-mail header (X-Priority) of the final e-mail transmitted to the users A and B. Accordingly, mark (icon) indicating a specific importance of "low" is added to that final e-mail and displayed in the e-mail application installed in the users' PCs. Through this, each user can confirm, at a glance, that the serial workflow has ended.

FIG. 11 is a flowchart illustrating a confirmation flow for confirming a step of a workflow using a coversheet of image data printed in Step S115 of FIG. 10B.

First, the user A logs on to the image forming apparatus 110, to which the workflow executing apparatus of the present embodiment has been applied. After this, the user A presses the confirm key 408 in the workflow list screen illustrated as an example in FIG. 4, displayed in the touch panel section of the console unit 312. Accordingly, in Step S201, the image forming apparatus 110 displays a "workflow confirmation" screen and starts a confirmation process. Then, the user A sets a cover sheet on the platen glass in accordance with screen instructions displayed in the "workflow confirmation" screen, and instructs the document to be read. As a result, the procedure advances to Step S202, where, having received instructions from the workflow execution section 306, the scanner control section 308 reads the cover sheet set by the user A on the platen glass. The image data read from the cover sheet is stored in the memory 302.

The procedure then advances to Step S203, where, having received instructions from the workflow execution section 306, the workflow data analyzing section 3102 acquires the workflow information embedded in the barcode printed on the coversheet from the image data read in Step S202. Identifiers including the flow ID and name of the workflow, the flow job ID, the e-mail address of the user that started the workflow, the Message-Id of the first transmitted e-mail, and so on are included in the workflow information.

Next, the procedure advances to Step S204, where the workflow execution section 306 uses the workflow information acquired in Step S203 as a key and acquires information from the workflow data storage section 3041 and the workflow status storage section 3042. Then, based on the acquired information, the workflow execution section 306 provides instructions to the operation control section 305, displaying the details and processing status of the workflow in the "workflow confirmation" screen. The user A can confirm the details and processing status of the workflow using the "workflow confirmation" screen.

The procedure then advances to Step S205, where the workflow execution section 306 provides an instruction to the workflow process e-mail transmission section 3072 so as to transmit a "confirm" e-mail, in which this workflow information is written, to the e-mail address acquired in Step S203 (the user A's e-mail address). This "confirm" e-mail is transmitted having the Message-Id identifier acquired in Step S203 (wf004-350.001@mfp1.mail.jp) set in the References field of the e-mail header.

A list of e-mails can be displayed using a thread display in the e-mail applications of the user A's user PC, such as shown in FIG. 8, by associating the e-mail headers with one another in such a manner. A "confirm" e-mail is also incorporated into and displayed in the same thread that includes the e-mails received from a workflow. Accordingly, the user A can understand and visually confirm which workflow the image data corresponding to the "confirm" e-mail is related to.

Other Embodiments

The present invention can also be achieved by directly or remotely supplying a software program that realizes the functionality of the above-mentioned embodiment to a system or device, whereupon a computer in the system or device reads out and executes the supplied program. In such a case, the format does not necessarily need to be a program, as long as it has the functionality of a program.

Accordingly, the program code itself, installed in a computer so as to realize the functional processing of the present invention through a computer, also realizes the present invention. In other words, the computer program itself, for realizing the functional processing of the present invention, is also included within the scope of the claims of the present invention. In this case, a program may be in any form, and object code, a program executed through an interpreter, script data supplied to an OS, or the like may be used, as long as it has the functionality of the program.

Various storage media can be used for supplying the program. Examples thereof include a Floppy® disk, a hard disk, an optical disk, a magneto-optical disk, an MO, a CD-ROM, a CD-R, a CD-RW, magnetic tape, a non-volatile memory card, a ROM, a DVD (DVD-ROM, DVD-R), and so on.

Alternatively, using a browser of a client computer to connect to an Internet homepage and downloading the computer program of the present invention to a storage medium such as a hard disk can be given as another method for supplying the program. In this case, the downloaded item may be the computer program of the present invention itself or a compressed file including a function for automatic installation. Furthermore, this method may be realized by dividing the program code that makes up the program of the present invention into a plurality of files and downloading each file from different homepages. In other words, a WWW server that allows a plurality of users to download the program files for realizing the functional processing of the present invention through a computer is also included within the scope of the claims of the present invention.

In addition, the program of the present invention may be encrypted, stored in a storage medium such as a CD-ROM or the like, and distributed to a user. In this case, a user that has cleared a predetermined condition is allowed to download key information for removing the cryptography from a homepage via the Internet, use the key information to decrypt the program into an executable format, and install the program on a computer.

In addition to a computer realizing the functionality of the aforementioned embodiments by executing a read-out program, the functionality of the embodiments may be realized through another form. For example, an OS or the like running on the computer can perform part or all of the actual processing based on instructions from the program, and the functionality of the aforementioned embodiments can be realized through this processing.

Furthermore, the program read out from the storage medium may be written into a memory provided in a function expansion board installed in the computer or a function expansion unit connected to the computer. In this case, after the program has been written into the function expansion board, function expansion unit, or the like, a CPU or the like provided in the function expansion board, function expansion unit, or the like executes part or all of the actual processing based on instructions of the program, and the functionality of the aforementioned embodiments can be realized through this processing.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims priority from Japanese Patent Application No. 2007-99748, filed Apr. 5, 2007, which is hereby incorporated by reference herein in its entirety.

What is claimed is:

1. A workflow executing apparatus for executing processing in accordance with a workflow that includes a plurality of processing steps, the apparatus comprising:

a transmission control unit; and an e-mail transmission unit configured to create and transmit a particular workflow status e-mail, during processing of the workflow and in response to an instruction from the transmission control unit, the e-mail transmission unit being configured to transmit the particular workflow status e-mail to a device used by a user that requested the workflow be executed, the workflow being executed in accordance with workflow information in which content of processing of the plurality of processing steps is described, wherein the e-mail transmission unit is configured to create the particular workflow status e-mail at least by adding (a) identification information from a Message-Id header field of a previous workflow status e-mail created and transmitted by the e-mail transmission unit to (b) a References header field of the particular workflow status e-mail being created, even though the particular workflow status e-mail being created normally would not have (a) added to (b), so that the previous workflow status e-mail and the particular workflow status e-mail being created consequently are configured to be displayed by the device used by the user as an e-mail thread, and wherein said units include at least physical hardware components of the workflow executing apparatus.

2. An apparatus accordingly to claim 1, further comprising:

a printing unit configured to print on a recording sheet; and a document reading unit configured to read a sheet and acquire image data corresponding to the sheet, wherein said printing unit is configured to print the identification information onto a recording sheet during the process of the workflow, said document reading unit is configured to read the recording sheet onto which the identification information has been printed and to recognize the identification information, and said e-mail transmission unit is configured to add the recognized identification information to an e-mail and to transmit the e-mail to which the recognized identification information is added.

3. An apparatus according to claim 1, wherein said e-mail transmission unit is configured to add information to the final e-mail transmitted at the final processing step of the workflow process, the information making it possible to identify that e-mail as the final e-mail.

4. An apparatus according to claim 3, wherein said e-mail transmission unit is configured to set one of the X-Priority, X-MSMail-Priority, Importance, Sensitivity, and Priority headers in the e-mail header region of the final e-mail, and to set a value indicating a specific priority defined for that header in the final e-mail.

5. An apparatus according to claim 1, further comprising a user data storage unit configured to store at least an e-mail address and authorization data of the user in association with identification information for the user, wherein said e-mail transmission unit is configured to refer to said user data storage unit and to transmit an e-mail to the e-mail address of the user that requested the execution of the workflow.

6. A control method of a workflow executing apparatus that executes a process in accordance with a workflow that includes a plurality of processing steps, the method comprising the steps of:

an e-mail transmission unit creating and transmitting a particular workflow status e-mail, during processing of the workflow and in response to an instruction from a transmission control unit, to a device used by a user that requested the workflow be executed, the workflow being executed in accordance with workflow information in which content of processing of the plurality of processing steps is described, wherein the creating and transmitting steps include creating the particular workflow status e-mail at least by adding (a) identification information from a Message-Id header field of a previous workflow status e-mail created and transmitted by the e-mail transmission unit to (b) a References header field of the particular workflow status e-mail being created, even though the particular workflow status e-mail being created normally would not have (a) added to (b), so that the previous workflow status e-mail and the particular workflow status e-mail being created consequently are configured to be displayed by the device used by the user as an e-mail thread, and wherein said steps are implemented at least in part by physical hardware components of the workflow executing apparatus.

7. A method according to claim 6, further comprising the steps of:

printing on a recording sheet; and reading a sheet and acquiring image data corresponding to the sheet, wherein in said printing step, the identification information is printed onto a recording sheet during the process of the workflow, in said reading step, the recording sheet onto which the identification information has been printed is read and the identification information is recognized, and wherein the method further comprises the steps of adding the recognized identification information to an e-mail and transmitting the e-mail to which the recognized identification information is added.

8. A method according to claim 6, further comprising the step of adding information to the final e-mail transmitted at the final processing step of the workflow process, the information making it possible to identify that e-mail as the final e-mail.

9. A method according to claim 8, wherein in said adding information step, one of the X-Priority, X-MSMail-Priority, Importance, Sensitivity, and Priority headers is set in the e-mail header region of the final e-mail, and a value indicating a specific priority defined for that header is set in the final e-mail.

10. A method according to claim 9, further comprising the steps of:

storing at least an e-mail address and authorization data of the user in association with identification information for the user; and referring to the information stored in said storing step in order to transmit an e-mail to the e-mail address of the user that requested the execution of the workflow.

11. A non-transitory computer-readable storage medium storing a program that, when executed by a computer, causes the computer to execute a control method of a workflow executing apparatus, the method comprising the steps of:

an e-mail transmission unit creating and transmitting a particular workflow status e-mail, during processing of the workflow and in response to an instruction from a transmission control unit, to a device used by a user that requested the workflow be executed, the workflow being executed in accordance with workflow information in which content of processing of the plurality of processing steps is described, wherein the creating and transmitting steps include creating the particular workflow status e-mail at least by adding (a) identification information from a Message-Id header field of a previous workflow status e-mail created and transmitted by the e-mail transmission unit to (b) a References header field of the particular workflow status e-mail being created, even though the particular workflow status e-mail being created normally would not have (a) added to (b), so that the previous workflow status e-mail and the particular workflow status e-mail being created consequently are configured to be displayed by the device used by the user as an e-mail thread.

* * * * *